US010638267B2

(12) United States Patent
Kim et al.

(10) Patent No.: US 10,638,267 B2
(45) Date of Patent: Apr. 28, 2020

(54) METHOD AND APPARATUS FOR PROCESSING LOCATION INFORMATION OF TERMINAL OPERATING IN BEACON

(71) Applicant: SAMSUNG ELECTRONICS CO., LTD., Suwon-si, Gyeonggi-do (KR)

(72) Inventors: Junhyung Kim, Yongin-si (KR); Hyukjoong Kwon, Suwon-si (KR); Sunghoon Kim, Seoul (KR); Dongkeon Kong, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 59 days.

(21) Appl. No.: 15/481,816

(22) Filed: Apr. 7, 2017

(65) Prior Publication Data

US 2017/0295459 A1 Oct. 12, 2017

(30) Foreign Application Priority Data

Apr. 8, 2016 (KR) .................... 10-2016-0043288

(51) Int. Cl.
*H04W 4/029* (2018.01)
*H04W 4/02* (2018.01)
(Continued)

(52) U.S. Cl.
CPC .............. *H04W 4/029* (2018.02); *G01S 1/68* (2013.01); *H04L 67/18* (2013.01); *H04W 4/023* (2013.01); *H04W 4/80* (2018.02)

(58) Field of Classification Search
CPC ........... H04W 4/02; H04W 4/028; G01S 1/68
See application file for complete search history.

(56) References Cited

U.S. PATENT DOCUMENTS

2012/0322459 A1* 12/2012 Jaffri .................... G01S 1/68
455/456.1
2013/0065584 A1 3/2013 Lyon et al.
(Continued)

FOREIGN PATENT DOCUMENTS

KR 10-1502607 3/2015

OTHER PUBLICATIONS

Extended European Search Report issued in Appln. No. 17165486.6 dated May 30, 2017.

*Primary Examiner* — Muthuswamy G Manoharan
(74) *Attorney, Agent, or Firm* — Nixon & Vanderhye P.C.

(57) ABSTRACT

The present disclosure relates to a sensor network, Machine-to-Machine (M2M), Machine Type Communication (MTC), and technology for Internet of Things (IoT). The present disclosure may be applied to intelligent services based on the above technologies, such as, for example, and without limitation, smart home, smart building, smart city, smart car or connected car, health care, digital education, retail, security and safety services.

A method for operating a management server configured to process location information of a terminal includes receiving, from a mobile terminal, a mobile terminal ID of the mobile terminal and a beacon terminal ID of a beacon terminal broadcast by the beacon terminal; generating first location information related to the mobile terminal ID and the beacon terminal ID and indicating an estimated location of the mobile terminal; and generating content information based on the first location information and transmitting the content information to the mobile terminal.

14 Claims, 22 Drawing Sheets

(51) Int. Cl.
*H04W 4/80* (2018.01)
*H04L 29/08* (2006.01)
*G01S 1/68* (2006.01)

(56) References Cited

U.S. PATENT DOCUMENTS

| | | |
|---|---|---|
| 2013/0225197 A1 | 8/2013 | McGregor et al. |
| 2014/0310366 A1* | 10/2014 | Fu .................... H04L 51/04 |
| | | 709/206 |
| 2015/0005011 A1* | 1/2015 | Nehrenz ............. H04W 4/02 |
| | | 455/456.3 |
| 2015/0031393 A1* | 1/2015 | Post .................. H04W 4/025 |
| | | 455/456.2 |
| 2015/0237463 A1* | 8/2015 | Stuttle ................ H04W 4/02 |
| | | 455/456.3 |
| 2016/0094946 A1 | 3/2016 | Keithley |
| 2017/0085417 A1* | 3/2017 | O'Reirdan ......... H04L 41/0668 |

* cited by examiner

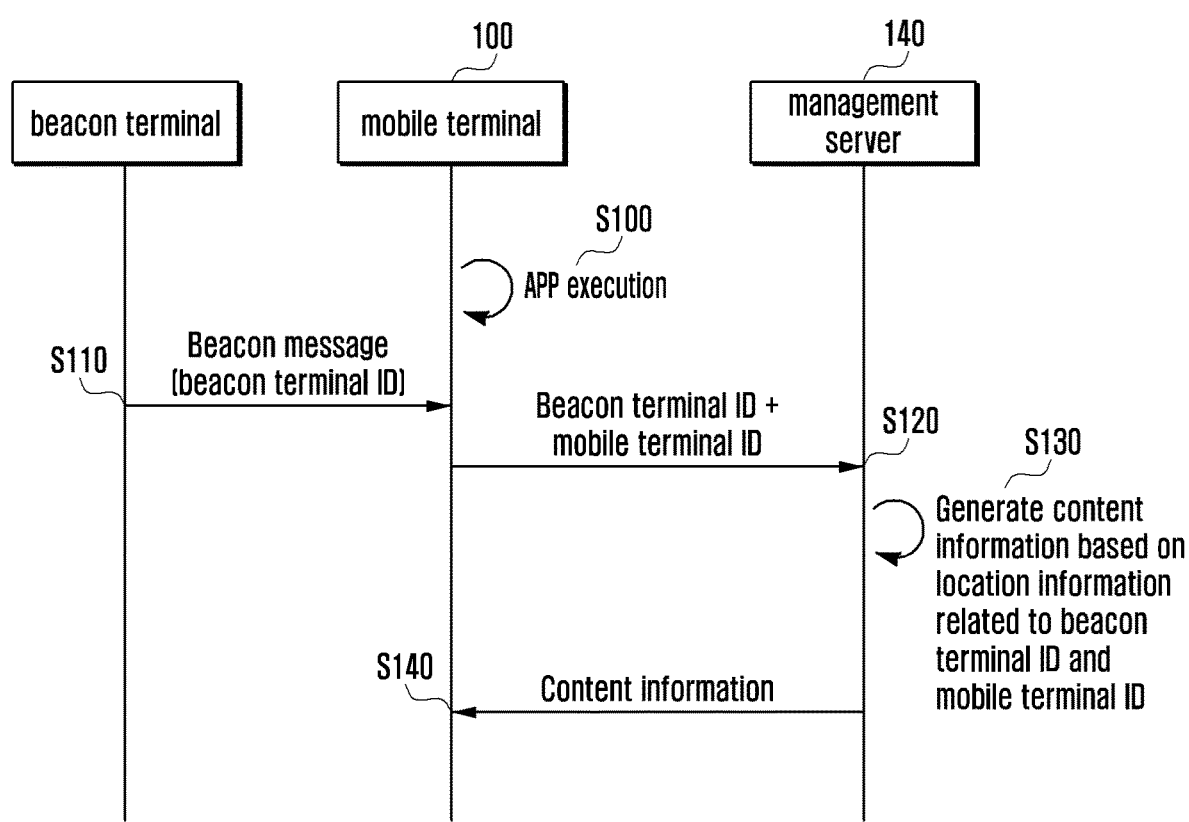

METHOD AND APPARATUS FOR PROCESSING LOCATION INFORMATION OF TERMINAL OPERATING IN BEACON

CROSS-REFERENCE TO RELATED APPLICATION

This application is based on and claims priority under 35 U.S.C. § 119 to Korean Application No. 10-2016-0043288 filed in the Korean Intellectual Property Office on Apr. 8, 2016, the disclosure of which is incorporated by reference herein in its entirety.

BACKGROUND

Field

The present disclosure relates generally to a method and an apparatus for processing location information of a terminal that operates in a beacon through mutual information exchange between mobile terminals.

Description of Related Art

The Internet, which is a human centered connectivity network where humans generate and consume information, is now evolving to the Internet of Things (IoT) where distributed entities, such as things, exchange and process information. The Internet of Everything (IoE), which is a combination of the IoT technology and big data processing technology through connection with a cloud server, has emerged. As technology elements, such as sensing technology, wired/wireless communication and network infrastructure, service interface technology, and security technology have been demanded for IoT implementation, a sensor network, a Machine-to-Machine (M2M) communication, Machine Type Communication (MTC), and so forth have been recently researched.

Such an IoT environment may provide intelligent Internet Technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing Information Technology (IT) and various industrial applications.

Recently, as communication technology to substitute for Near Field Communication (NFC) that is short-range wireless communication, Bluetooth Low Energy (BLE) beacon using BLE has been proposed. The BLE beacon has been used in various fields including situation marketing, purchase, and auto check-in in addition to providing of simple location information. The effective communication distance of the NFC is generally limited to about 4 to 20 cm, whereas the effective communication distance of the BLE beacon has been expanded to about 5 to 50 cm.

Further, in the NFC, a separate chip is typically installed for each electronic device, whereas in the BLE beacon, short-range wireless communication using the beacon is possible so far as only BLE recognition function is provided. Due to this, the BLE beacon is more economical than the NFC, and the wireless communication service can be provided even in a wide room.

The BLE beacon has the advantage of low power consumption enough to provide the wireless communication service for one year or more using one coin-sized battery.

Further, in previous versions of Bluetooth, the number of slave devices is limited to about 7, whereas in the latest versions of, for example, BLE 4.0, synchronization with unlimited slave devices becomes possible.

According to such a BLE beacon technology, fixed information is carried on a packet to be broadcasted, and thus several pieces of information (e.g., images and moving images) can be advertised in one electronic device.

SUMMARY

The present disclosure addresses the above problems, and an example aspect of the present disclosure provides a method and an apparatus capable of widening the service coverage of Bluetooth Low Energy (BLE) beacon of mobile terminals through mutual information exchange between the mobile terminals.

In accordance with an example aspect of the present disclosure, a method for operating a management server that processes location information of a terminal includes receiving, from a mobile terminal, a mobile terminal ID of the mobile terminal and a beacon terminal ID of a beacon terminal that is broadcasted by the beacon terminal; generating first location information related to the mobile terminal ID and the beacon terminal ID the first location information indicating an estimated location of the mobile terminal; and generating content information based on the first location information and transmitting the content information to the mobile terminal.

The first location information may be generated using at least one of first path history information for the mobile terminal ID and second path history information for the beacon terminal ID.

The content information may be information related to the estimated location of the mobile terminal and may be in the form of at least one of a text, a voice, an image, and a video.

The method for operating a management server may further include updating at least one of the first path history information and the second path history information for a predetermined time, and generating location change information of the mobile terminal using at least one of the updated first path history information and second path history information; and generating the content information related to the location change in accordance with the time of the mobile based on the location change information.

The method for operating a management server may further include receiving, from the mobile terminal or the beacon terminal, a plurality of beacon terminal IDs broadcast by a plurality of beacon terminals that are adjacent to the beacon terminal to heighten estimation accuracy of the first location information, wherein the first location information is generated based on at least one of the first path history information and the second path history information and third path history information related to the plurality of beacon terminal IDs.

The method for operating a management server may further include receiving, from the mobile terminal, a signal strength measurement of a beacon message that is transmitted from the beacon terminal and includes the beacon terminal ID; and applying a weight value to the beacon terminal ID related to the beacon terminal if the measurement signal strength is higher than a preset signal strength, and updating the first location information using the weight value.

The method for operating a management server may further include determining a beacon terminal stay time that indicates time in which the beacon terminal stays in a Radio Frequency (RF) coverage of the mobile terminal; and comparing the beacon terminal stay time with a preset stay time, applying a weight value to the beacon terminal ID related to the beacon based on the comparison, and updating the first location information using the weight value.

The method for operating a management server may further include receiving, from the mobile terminal or the beacon terminal, first fixed location information for a first fixed beacon adjacent to the beacon terminal and installed in a first space, wherein the first location information is generated based at least one of the first path history information and the second path history information and the first fixed location information.

The method for operating a management server may further include comparing second fixed location information for a second fixed beacon adjacent to the beacon terminal and installed in a second space with second location information if the second location information that indicates a location of the beacon terminal is pre-stored in the management server; generating a first setting message instructing the beacon terminal not to transmit the beacon terminal ID to the mobile terminal if the second fixed location information does not coincide with the second location information based on the comparison; and transmitting the first setting message to the beacon terminal.

The method for operating a management server may further include transmitting an activation flag signal to a third fixed beacon adjacent to the mobile terminal based on the first location information, wherein third fixed location information for the third fixed beacon is broadcast from the third fixed beacon in response to the activation flag signal.

In accordance with another example aspect of the present disclosure, a method for operating a mobile terminal includes receiving a beacon message broadcast by a beacon terminal; transmitting, to a management server, a mobile terminal ID of the mobile terminal and a beacon terminal ID of the beacon terminal included in the beacon message; and receiving, from the management server, content information generated based on first location information related to the mobile terminal ID and the beacon terminal ID and indicating an estimated location of the mobile terminal.

The method for operating a mobile terminal may further include transmitting a signal strength measurement of the beacon message to the management server, wherein if the measurement signal strength is higher than a preset strength, a weight value is applied to the beacon terminal ID related to the beacon terminal, and the first location information is updated using the weight value.

The method for operating a mobile terminal may further include transmitting, to the management server, a beacon terminal stay time indicating a time in which the beacon terminal stays in a Radio Frequency (RF) coverage of the mobile terminal, wherein a weight value is applied to the beacon terminal ID related to the beacon terminal based on a result of comparison of the beacon terminal stay time with a preset stay time, and the first location information is updated using the weight value.

The method for operating a mobile terminal may further include receiving, from the beacon terminal, fixed location information for a fixed beacon adjacent to the beacon terminal and installed in a first space; and transmitting the fixed location information to the management server, wherein the content information is generated based on at least one of first path history information and second path history information and the fixed location information.

In accordance with still another example aspect of the present disclosure, a management server that processes location information of a terminal includes a transceiver unit comprising transceiver circuitry configured to transmit and receive signals; and a control unit comprising a controller comprising processing circuitry configured to receive, from a mobile terminal, a mobile terminal ID of the mobile terminal and a beacon terminal ID of a beacon terminal broadcast by the beacon terminal, to generate first location information related to the mobile terminal ID and the beacon terminal ID and indicating an estimated location of the mobile terminal, to generate content information based on the first location information, and to transmit the content information to the mobile terminal.

In accordance with yet still another example aspect of the present disclosure, a mobile terminal includes a transceiver unit comprising transceiver circuitry configured to transmit and receive signals; and a control unit including a controller comprising processing circuitry configured to receive a beacon message broadcast by a beacon terminal, to transmit, to a management server, a mobile terminal ID of the mobile terminal and a beacon terminal ID of the beacon terminal included in the beacon message, and to receive, from the management server, content information generated based on first location information related to the mobile terminal ID and the beacon terminal ID and indicating an estimated location of the mobile terminal.

According to the method and the apparatus for processing location information of a terminal that operates in a beacon according to example aspects of the present disclosure, the Bluetooth Low Energy (BLE) beacon service coverage of the mobile terminal can be extended through mutual information exchange between mobile terminals, and content that is related to the location information of the mobile terminal can be provided.

BRIEF DESCRIPTION OF THE DRAWINGS

The above and other aspects, features and attendant advantages of the present disclosure will be more readily appreciated and understood from the following detailed description, taken in conjunction with the accompanying drawings, in which like reference numerals refer to like elements, and wherein:

FIG. 1B is a flowchart illustrating an example method in which a management server provides content information to a mobile terminal according to an example embodiment of the present disclosure;

DETAILED DESCRIPTION

Figure 1A:
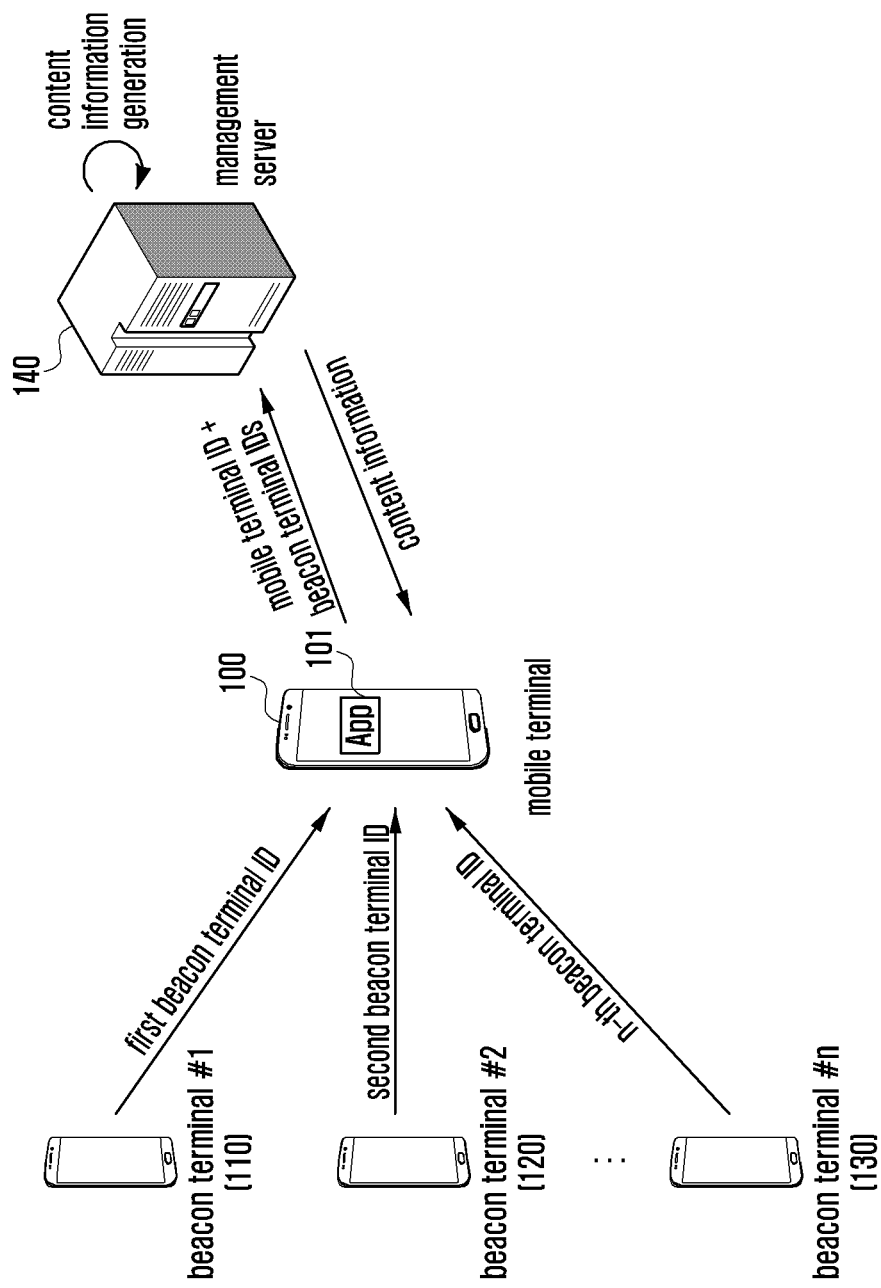
FIG. 1A is a diagram illustrating an example method in which a management server provides content information to a mobile terminal according to an example embodiment of the present disclosure.

Hereinafter, various example embodiments of the present disclosure will be described in greater detail with reference to the accompanying drawings. In the accompanying drawings, it is to be noted that the same drawing reference numerals are used for the same elements. Further, detailed explanation of known functions and configurations, which may obscure the subject matter of the present disclosure, may be omitted.

In describing various example embodiments in the following description, explanation of technical contents which are well known in the art to which the present disclosure pertains and are not directly related to the present disclosure may be omitted.

For the same reason, in the accompanying drawings, sizes and relative sizes of some elements may be exaggerated or omitted. Further, sizes of the respective elements do not necessarily reflect the actual sizes thereof. In the drawings, the same drawing reference numerals are used for the same or corresponding elements across various figures.

The various example aspects and features of the present disclosure and methods for achieving the aspects and features will be apparent by referring to the example embodiments described in detail with reference to the accompanying drawings. However, the present disclosure is not limited to the example embodiments disclosed hereinafter, but can be implemented in diverse forms. The matters defined in the description, such as the detailed construction and elements, are simply example details provided to assist those of ordinary skill in the art in a comprehensive understanding of the disclosure, and the present disclosure is defined by the scope of the appended claims.

It will be understood that each block of the flowchart illustrations, and combinations of blocks in the flowchart illustrations, can be implemented by computer program instructions, including various program elements. These computer program instructions can be provided to a processor of a general purpose computer, special purpose computer, or other programmable data processing apparatus to produce a machine, such that the instructions, which execute via the processor of the computer or other programmable data processing apparatus, may cause implementation of the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions, which when executed by a processor and/or device including a processor, implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein may, for example, refer to, but is not limited to, a software or hardware component, such as, for example, and without limitation, a dedicated processor, a CPU, an FPGA or an ASIC, which performs certain tasks. However, a unit is not limited to software or hardware. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Further, the components and units may be implemented to operate one or more CPUs in a device or a security multimedia card.

In the description, the term "module" may refer, for example, to hardware that can perform functions and operations according to respective titles as described in the description, may refer, for example, to a computer program code that can perform specific functions and operations, or may refer, for example, to an electromagnetic recording medium, for example, processor, that is mounted with a computer program code that can perform specific functions and operations.

FIG. 1A is a diagram illustrating an example method in which a management server provides content information to a mobile terminal according to an example embodiment of the present disclosure.

Referring to FIG. 1A, if a first application program 101 that is installed in a mobile terminal 100 is executed, the mobile terminal 100 may receive beacon terminal IDs that are broadcast from neighboring beacon terminals 110, 120 and 130 to the mobile terminal 100 using the first application program 101. However, example embodiments of the present disclosure are not limited to a case where a specific application program that is installed in the mobile terminal 100 is driven, but can also be applied to a case where the mobile terminal 100 triggers a specific event in addition to the application program.

According to various example embodiments, the mobile terminal 100 may operate as a mobile beacon, and the neighboring beacon terminals 110 to 130 may operate as mobile beacons or fixed beacons.

For example, the mobile terminal 100 may receive the first beacon terminal ID from the first terminal 110, may receive the second beacon terminal ID from the second terminal 120, and may receive the n-th beacon terminal ID from the n-th terminal (where, n is a natural number that is larger than 2) 130.

The mobile terminal 100 may transmit the mobile terminal ID of the mobile terminal 100 and the beacon terminal ID of any one of the neighboring beacon terminals 110 to 130 to a management server 140.

The management server 140 may generate first location information that is related to the mobile terminal ID and the beacon terminal ID and indicates an estimated location of the mobile terminal 100, and may generate content information to be provided to the mobile terminal 100 based on the first location information.

The first location information may be generated using at least one of first path history information for the mobile terminal ID and second path history information for the beacon terminal ID.

The first path history information may include, for example, and without limitation, previous location information that is related to the mobile terminal ID, current location information, visit expectation location information, and visit history information for a specific place. The second path history information may include, for example, and without limitation, previous location information that is related to the beacon terminal ID, current location information, visit expectation location information, and visit history information for a specific place.

The content information may, for example, include information that is related to the estimated location (or expected path) of the mobile terminal 100, and may refer, for example, to various kinds of information, such as a text, a voice, an image, and a video, that are generated (or processed) by the management server 140. For example, the content information may be public transportation usage information related to the estimated location (or expected path) of the mobile terminal 100, article discount information (e.g., discount information of a clothes shop), or coupon information, or the like, but is not limited thereto.

The management server 140 may store the first path history information and the second path history information in a database, and may update the first path history information and the second path history information periodically (or non-periodically).

The management server 140 may estimate the location of the mobile terminal 100 using at least one of the first path history information and the second path history information, and may provide generated content information to the mobile terminal 100 based on the estimated location of the mobile terminal 100.

For example, the management server 140 may provide discount information of a clothes shop to the mobile terminal 100 as content information using the first path history information and the second path history information. If it is expected that the mobile terminal 100 moves to the clothes shop in which the first beacon terminal 110 stayed, the management server 140 may transmit the discount information of the clothes shop that is received from the first beacon terminal 110 to the mobile terminal 100 as the content information. In this case, the discount information may be information which has been transmitted from a second application program that is installed in the first beacon terminal 110 to the management server 140.

The management server 140 may transmit the content information to the mobile terminal 100. The mobile terminal 100 may display the content information through a display of the mobile terminal 100.

According to the present disclosure, a specific service (e.g., location information providing, advertisement information providing, or social media) may be provided through mutual information exchange between moving mobile terminals, and as more users perform the mutual information exchange, more accurate and diverse information services can be provided. Further, according to the present disclosure, the existing beacon service coverage can be extended through the mutual information exchange between the mobile terminals, and interactive communication can be provided between anonymous users.

FIG. 1B is a flowchart illustrating an example method in which a management server provides content information to a mobile terminal according to an example embodiment of the present disclosure.

Referring to FIG. 1B, a user of a mobile terminal may execute an application program that is installed in the mobile terminal (S100). The application program may refer, for example, to a program that can control the mobile terminal to communicate with a neighboring beacon terminal and the management server, and can process content information that is generated from the management server on the basis of a beacon message that is received from the beacon terminal. As described above, the application may not be executed, and if a specific event occurs, it may execute the following operation.

The beacon terminal may broadcast a beacon message that includes the beacon terminal ID of the beacon terminal to the mobile terminal (S110). The mobile terminal may transmit the mobile terminal ID of the mobile terminal and the beacon terminal ID of the beacon terminal to the management server (S120).

The management server may generate first location information that is related to the mobile terminal ID and the beacon terminal ID and indicates an estimated location of the mobile terminal, and may generate the content information based on the first location information (S130).

The first location information may be generated using at least one of first path history information for the mobile terminal ID and second path history information for the beacon terminal ID.

The management server may update at least one of the first path history information and the second path history information for a predetermined time, and may generate location change information of the mobile terminal using at least one of the updated first path history information and second path history information. The management server may generate the content information related to the location change in accordance with the time of the mobile terminal based on the location change information.

The management server may transmit the content information to the mobile terminal (S140), and the mobile terminal may display the content information through a display.

According to an example embodiment, to heighten estimation accuracy of the first location information, the management server may receive, from the mobile terminal or the beacon terminal, a plurality of beacon terminal IDs that are broadcast by a plurality of beacon terminals that are adjacent to the beacon terminal. In this case, the first location information may be generated based on at least one of the first path history information and the second path history information and third path history information that is related to the plurality of beacon terminal IDs.

According to another example embodiment, the management server may receive, from the mobile terminal, a signal strength measurement for a beacon message that is transmitted from the beacon terminal and includes the beacon terminal ID. If the signal strength measurement is higher (e.g., greater) than a preset strength, the management server may apply a weight value to the beacon terminal ID that is related to the beacon terminal, and may update the first location information using the weight value.

According to still another example embodiment, the management server may determine a beacon terminal stay time that indicates time in which the beacon terminal stays in a Radio Frequency (RF) coverage of the mobile terminal. The management server may compare the beacon terminal stay time with a preset stay time, apply a weight value to the beacon terminal ID that is related to the beacon terminal in accordance with the result of comparison, and update the first location information using the weight value.

According to still another example embodiment, the management server may receive, from the mobile terminal or the beacon terminal, first fixed location information for a first fixed beacon that is adjacent to the beacon terminal and is installed in a first space. In this example, the first location information may be generated based on at least one of the first path history information and the second path history information and the first fixed location information.

According to still another example embodiment, if the second location information that indicates the location of the beacon terminal is pre-stored in the management server, the management server may compare second fixed location information for a second fixed beacon that is adjacent to the beacon terminal and is installed in a second space with second location information. If the second fixed location information does not coincide with the second location information in accordance with the result of the comparison, the management server may generate a first setting message for instructing the beacon terminal not to transmit the beacon terminal ID to the mobile terminal, and may transmit the first setting message to the beacon terminal.

According to still another example embodiment, the management server may transmit an activation flag signal to a third fixed beacon that is adjacent to the mobile terminal based on the first location information. In this example, third fixed location information for the third fixed beacon may be broadcasted from the third fixed beacon in response to the activation flag signal.

On the other hand, if the content information that the management server provides to the mobile terminal is location-related information, it may be required to accurately estimate the location of the mobile terminal. For example, if the management server is a security server that is required to recognize and control an access area (or path) of the mobile terminal, or a guide server that guides a destination to the mobile terminal, the management server may include an algorithm for accurately estimating the location of the mobile terminal.

Hereinafter, referring to FIGS. 2 to 13, methods in which a management server estimates the location of a specific mobile terminal using identification information of a plurality of mobile terminals and provides location estimation information to the specific mobile terminal will be described.

In particular, FIGS. 2 to 13 are diagrams illustrating an example method in which a management server estimates the location of a visitor terminal using identification information of the visitor terminal and staff terminals in an office environment. However, this is merely an example for convenience in explanation, and various example embodiments of the present disclosure can be applied to various environments in addition to the office environment.

Figure 2A:
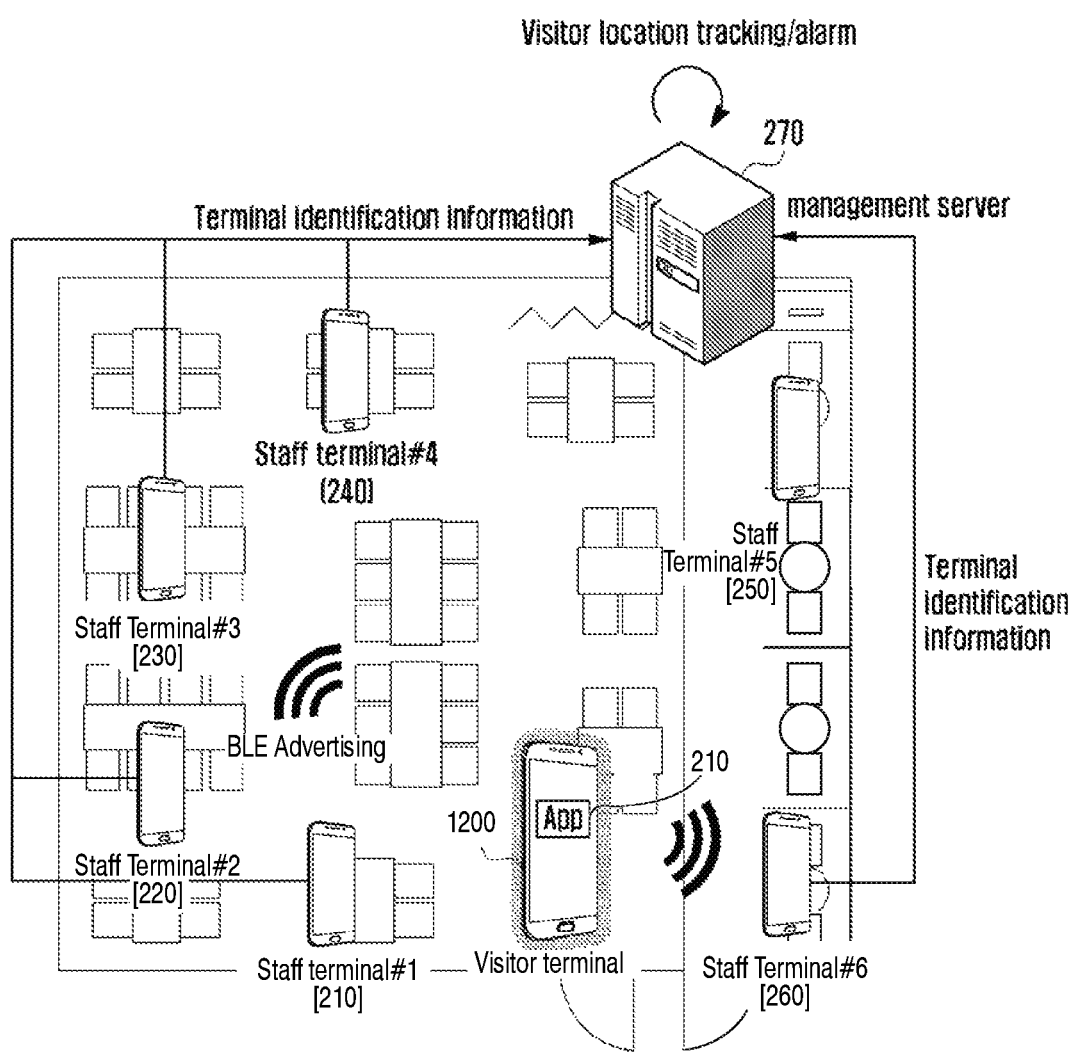
FIG. 2A is a diagram illustrating an example method for estimating the location of a mobile terminal according to an example embodiment of the present disclosure.

FIG. 2A is a diagram illustrating an example method for estimating the location of a mobile terminal according to an example embodiment of the present disclosure.

Referring to FIG. 2A, a user of a visitor terminal 200 may execute an application program 201 that is installed in the visitor terminal 200 in an environment that provides a location estimation service of a mobile terminal. The application program 201 may refer, for example, to a program that can issue a visitor ID when a visitor registers his/her visit, perform short-range wireless communication with staff terminals 210 to 260, and send/receive data with a management server 270.

If the visitor terminal 200 passes through an entrance of an office, the application program 201 that is installed in the visitor terminal 200 may broadcast a beacon message that includes first identification information (e.g., visitor ID) that is pre-issued through the short-range wireless communication.

The staff terminals 210, 220, 230, 240, 250 and 260 may receive the beacon message that is broadcast from the visitor terminal 200 through the short-range wireless communication. For example, the first staff terminal 210 that is adjacent to the visitor terminal 200 may receive the beacon message, but the fifth staff terminal 250 that is relatively far from the visitor terminal 200 may not receive the beacon message.

If the beacon message that is broadcast from the visitor terminal 200 is received, the staff terminals 210 to 260 may transmit second identification information (e.g., staff IDs) of the staff terminals 210 to 260 to the management server 270 together with the first identification information of the visitor terminal 200 that is included in the beacon message.

The management server 270 may estimate the location of the visitor terminal 200 based on location information that is mapped on the second identification information that is received from the staff terminals 210 to 260, and may generate location estimation information for the visitor terminal 200.

According to an example embodiment, the location information may be pre-stored in a database that is included in the management server 270 based, for example, on duty location information of users of the staff terminals 210 to 260. According to another example embodiment, the location information may be generated (or updated) based on the location information that is transmitted from the staff terminals 210 to 260 to the management server 270. For example, the location information may be set based on places that are assigned to office stationed staffs, or may be generated (or updated) through real-time location tracking with respect to the staff terminals 210 to 260.

The management server 270 may determine the locations of the staff terminals 210 to 260 that correspond to the second identification information using the location information that is mapped on the second identification information, and may estimate that the visitor terminal 200 is in the neighborhood of the location of the staff terminals 230 to 260.

The management server 270 may track the location of the visitor based on the location estimation information for the visitor terminal 200, and may transmit the location estimation information to the visitor terminal 200. According to an example embodiment, the management server 270 may transmit, for example, destination path information, unauthorized area alarm information, and destination expectation time consumption information to the visitor terminal 200 together with the location estimation information.

Figure 2B:
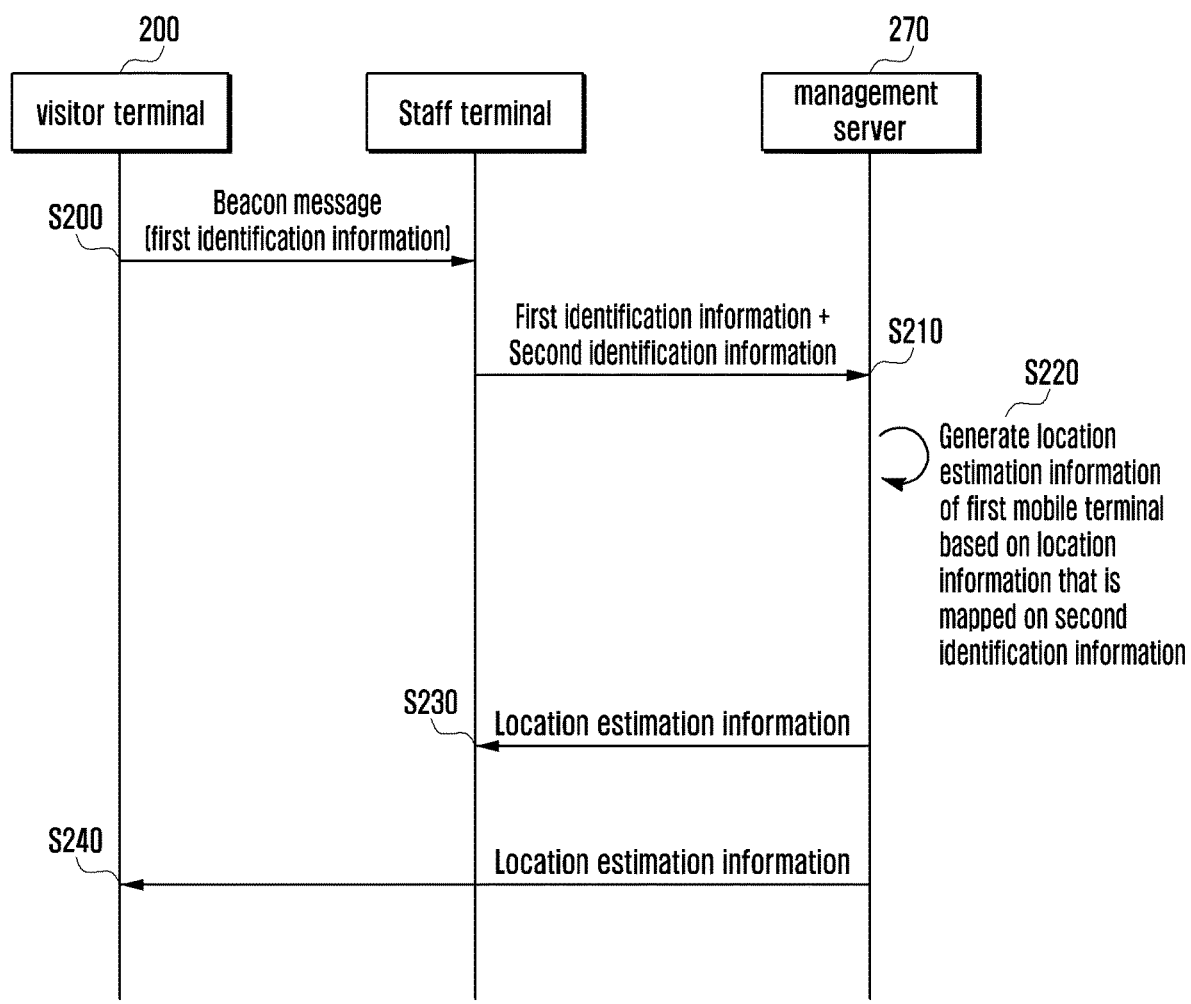
FIG. 2B is a flowchart illustrating an example method for estimating the location of a mobile terminal according to an example embodiment of the present disclosure.

FIG. 2B is a flowchart illustrating an example method for estimating the location of a mobile terminal according to an example embodiment of the present disclosure.

Referring to FIG. 2B, a visitor terminal may broadcast a beacon message that includes first identification information of the visitor terminal 200 to a staff terminal through short-range wireless communication (S200). The staff terminal may transmit second identification information of the second staff terminal to a management server together with the first identification information (S210).

The management server may estimate the location of the visitor terminal based on location information that is mapped on the second identification information, and may generate location estimation information of the visitor terminal (S220). The management server may transmit the location estimation information to the staff terminal (S230), or may transmit the location estimation information to the visitor terminal (S240).

The management server may update the second identification information that is transmitted from the staff terminal in a predetermined period, and may generate the location estimation information based on the updated second identification information.

The management server may receive third identification information of another staff terminal that is adjacent to the staff terminal from the staff terminal, may estimate the location of the visitor terminal based on the location information that is related to the second identification information and the third identification information, and may update the location estimation information.

The management server may receive signal strength information of the beacon message that is measured by the staff terminal from the staff terminal, may compare the signal strength information with a preset value, may apply a weight value to the location information that corresponds to the staff terminal in accordance with the result of the comparison, and may update the location estimation information using the weight value.

The management server may receive fixed location information for a first beacon that is installed in a first space from the staff terminal, may apply a weight value to the location information that corresponds to the staff terminal that has received the fixed location information, and may update the location estimation information for the visitor terminal using the location information to which the weight value has been applied and the fixed location information.

The management server may transmit an activation flag to the first beacon that is adjacent to the visitor terminal based on the location estimation information, and the fixed location information may be transmitted from the first beacon to the staff terminal in response to the activation flag.

Figure 3:
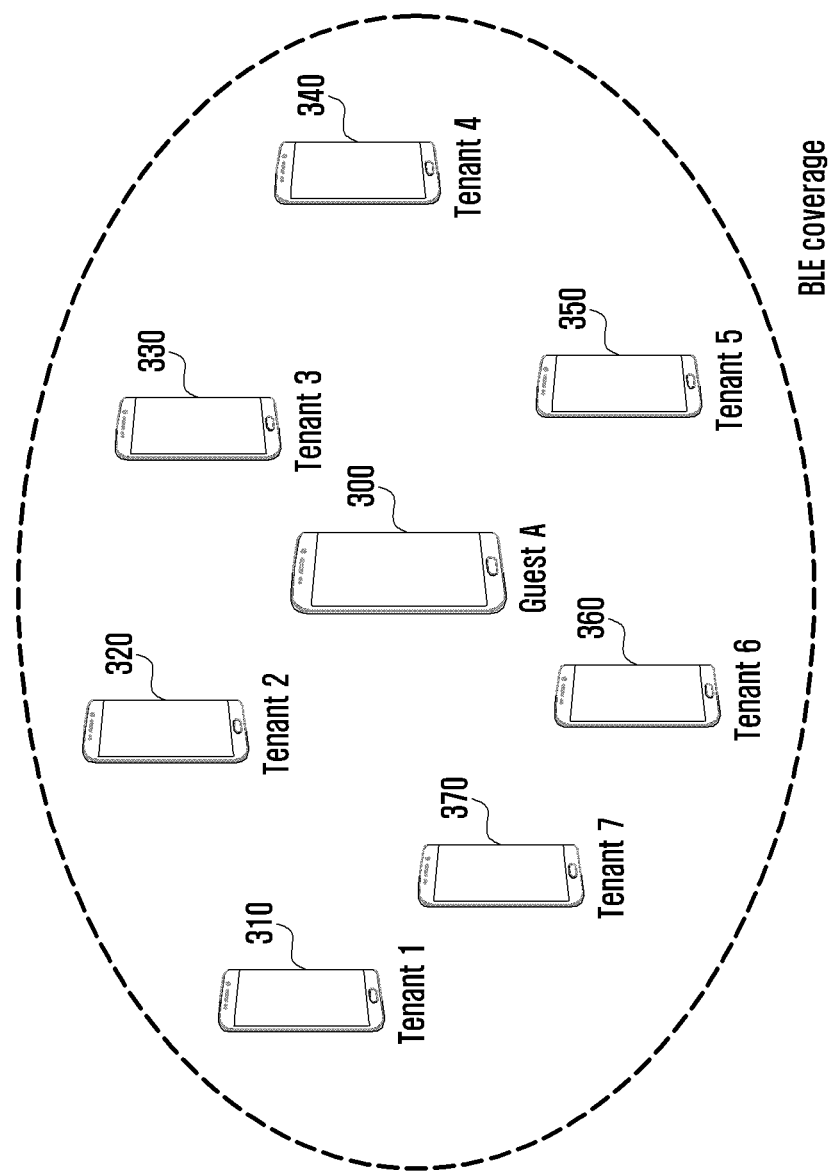
FIG. 3 is a diagram illustrating an example method in which a management server estimates the location of a mobile terminal according to an example embodiment of the present disclosure.

FIG. 3 is a diagram illustrating an example method in which a management server estimates the location of a mobile terminal according to an example embodiment of the present disclosure.

Referring to FIG. 3, a management server may receive first identification information of a visitor terminal 300 and second identification information of staff terminals 310, 32, 33, 340, 350, 360 and/or 370, and may estimate the location of the visitor terminal 300 based on the location information that is mapped on the second identification information. According to various example embodiments, the first identification information and the second identification information may be transmitted to the management server by the staff terminals 310 to 370, or may be transmitted from the visitor terminal 300 to the management server.

The location information may be stored in a database that is included in the management server, and may include the second identification information (e.g., tenant IDs) of the staff terminals 310 to 370 and locations that correspond to the second identification information. For example, the location information may indicate that the first staff terminal 310 is located in "E zone on the 19$^{th}$ floor" and the third staff terminal 330 is located in "C zone on the 20$^{th}$ floor" at a specific time.

In FIG. 3, it is assumed that the first staff terminal 310 and the second staff terminal 320 are visiting "E zone on the 19$^{th}$ floor" for a short time to attend a conference, and the remaining staff terminals 330 to 370 are working in their own places.

In this example, the management server may determine that the visitor terminal 300 is in the neighborhood of the staff terminals 310 to 370 through reception of the identification information of the respective staff terminals 310 to 370, and may estimate the location of the visitor terminal 300 based on the location information that is mapped on the identification information of the staff terminals 310 to 370 to generate location estimation information.

The management server may analyze the location information of the staff terminals 310 to 370, may estimate that the visitor terminal 300 is located in "20F C zone" in which many staff terminals 310 to 370 exist, and may generate the location estimation information that corresponds to the "20F C zone".

Figure 4:
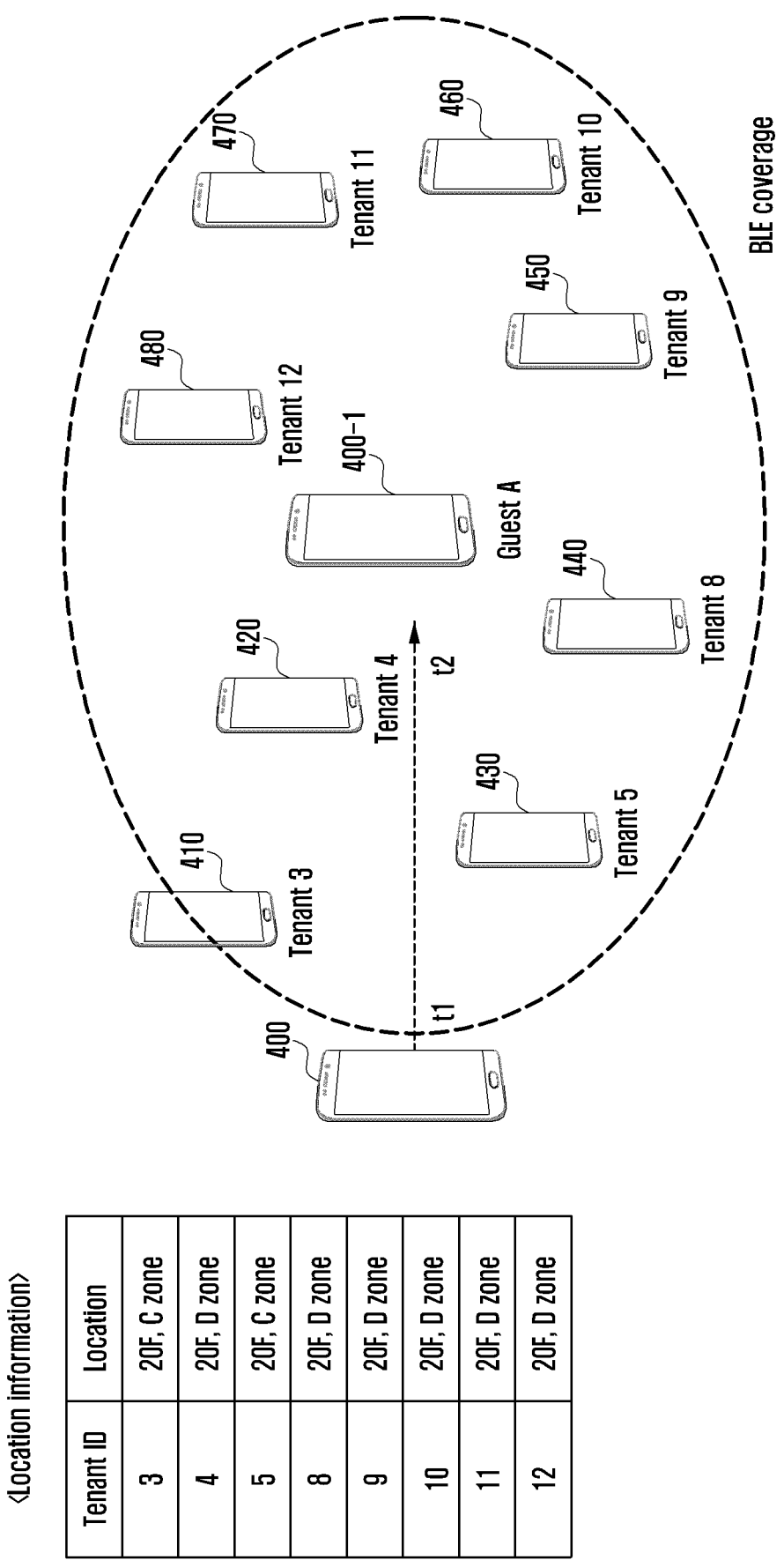
FIG. 4 is a diagram illustrating an example method in which a management server estimates the location of a mobile terminal according to another example embodiment of the present disclosure.

FIG. 4 is a diagram illustrating an example method in which a management server estimates the location of a mobile terminal according to another example embodiment of the present disclosure.

Referring to FIG. 4, a management server may receive first identification information of a visitor terminal 400 or 400-1 and second identification information of staff terminals 410, 420, 430, 440, 450, 460, 470 and/or 480, and may estimate the location of the visitor terminal 400 or 400-1 based on the location information that is mapped on the second identification information. According to various example embodiments, the first identification information and the second identification information may be transmitted to the management server by the staff terminals 410 to 480, or may be transmitted from the visitor terminal 400 or 400-1 to the management server.

According to the example embodiment of FIG. 3, the visitor terminal is in the fixed location, whereas according to the example embodiment of FIG. 4, the visitor terminal 400 or 400-1 moves with the lapse of time. The location of the visitor terminal 400 at first time t1 is different from the location of the visitor terminal 400-1 at second time t2, and the Bluetooth Low Energy (BLE) coverage of the terminal may also become different.

For convenience in explanation, it is assumed that at the first time t1, the visitor terminal 300 exists in the location of the visitor terminal of FIG. 3.

Referring to FIGS. 3 and 4, the visitor terminal 400 at the first time t1 may be sensed by the first to seventh staff terminals 310 to 370, and the visitor terminal 400-1 at the second time t2 may be sensed by the third to fifth staff terminals 410 to 430 and the eighth to $12^{th}$ staff terminals 440 to 480, as a non-limiting example.

The management server may estimate the location of the visitor terminal 400 through reception of the identification information of the first to seventh staff terminals 310 to 370 at the first time t1, may estimate the location of the visitor terminal 400-1 through reception of the identification information of the third to fifth staff terminals 410 to 430 and the eighth to $12^{th}$ staff terminals 440 to 480 at the second time t2, and may generate the location estimation information that includes the location change of the visitor terminal 400 or 400-1 in accordance with the time change.

The management server may confirm that there is the highest probability that the visitor terminal 400-1 is in "20F D zone" at the second time t2, using the location information of the third to fifth staff terminals 410 to 430 and the eighth to $12^{th}$ staff terminals 440-480, and may generate the location estimation information of the visitor terminal 400-1 at the second time t2. The management server may generate the location estimation information using the information that is measured in a predetermined period, and thus errors that occur in specific environments may be reduced.

For example, the management server may generate the location estimation information indicating that the visitor terminal 400 at the first time t1 is located in "20F C zone", and the visitor terminal 400-1 at the second time t2 is located in "20F D zone".

Figure 5:
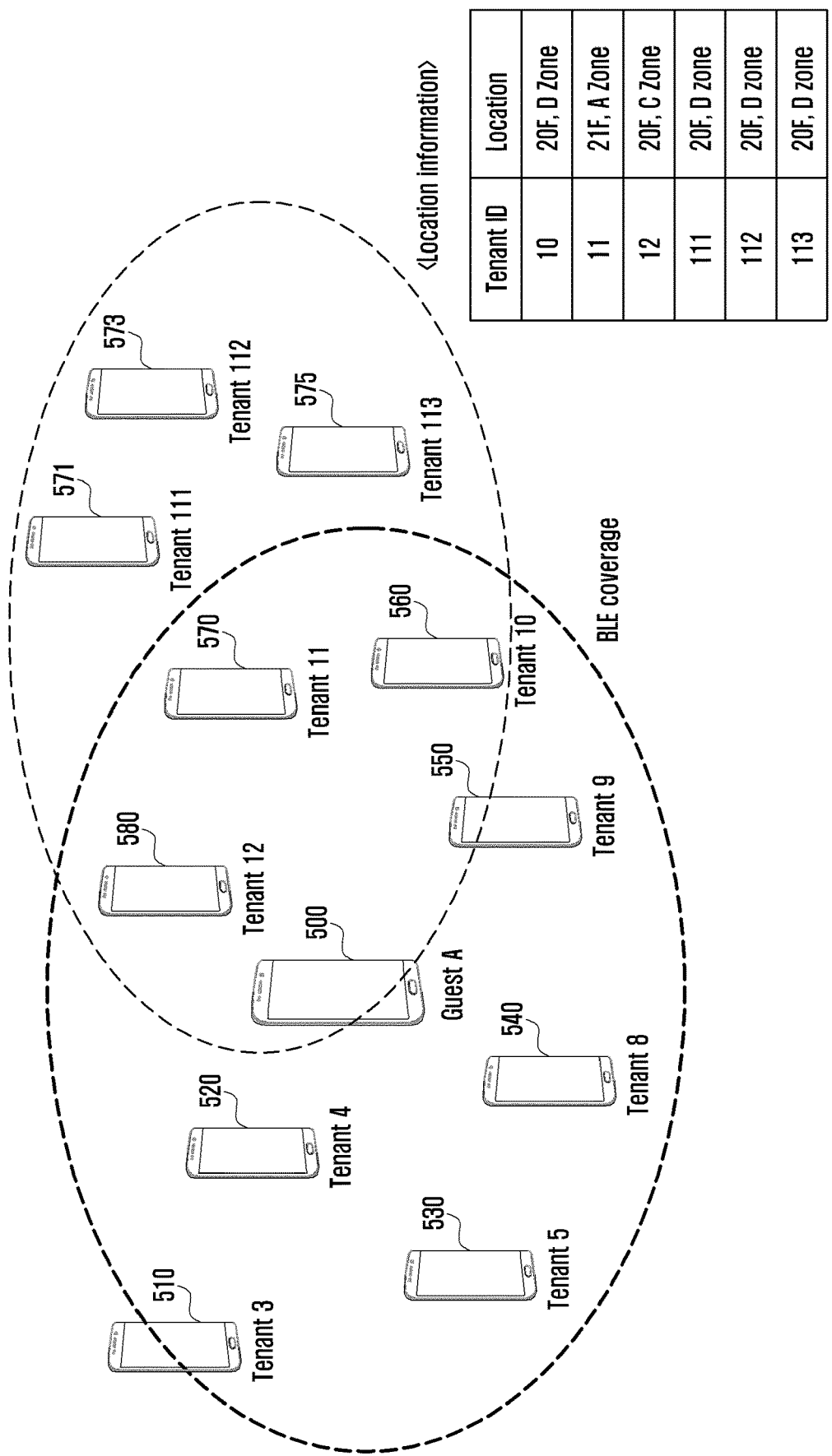
FIG. 5 is a diagram illustrating an example method in which a management server estimates the location of a mobile terminal according to still another example embodiment of the present disclosure.

FIG. 5 is a diagram illustrating an example method in which a management server estimates the location of a mobile terminal according to still another example embodiment of the present disclosure.

Referring to FIG. 5, a management server may receive first identification information of a visitor terminal 500 and second identification information of staff terminals 510, 520, 530, 540, 550, 560, 570 and/or 580, and may estimate the location of the visitor terminal 500 based on the location information that is mapped on the second identification information. According to various example embodiments, the first identification information and the second identification information may be transmitted to the management server by the staff terminals 510 to 580, or may be transmitted from the visitor terminal 500 to the management server.

In FIG. 5, the management server can widen the BLE coverage, increase target terminals, and improve the estimation accuracy of location estimation information by generating the location estimation information of the visitor terminal 500 through reflection of reference location information (e.g., neighboring location information) of the $11^{th}$ staff terminal 570. The reference location information means location information of adjacent terminals 571 to 575 that are located adjacent to the $11^{th}$ staff terminal 570.

The management server may receive location information of the adjacent terminals 571 to 575 that are located outside the BLE coverage from the $11^{th}$ staff terminal 570, may estimate the location of the visitor terminal 500 using the location information that is mapped on the identification information of the existing staff terminals 510 to 580 and the location information of the adjacent terminals 571 to 575, and may generate the location estimation information of the visitor terminal 500.

Figure 6:
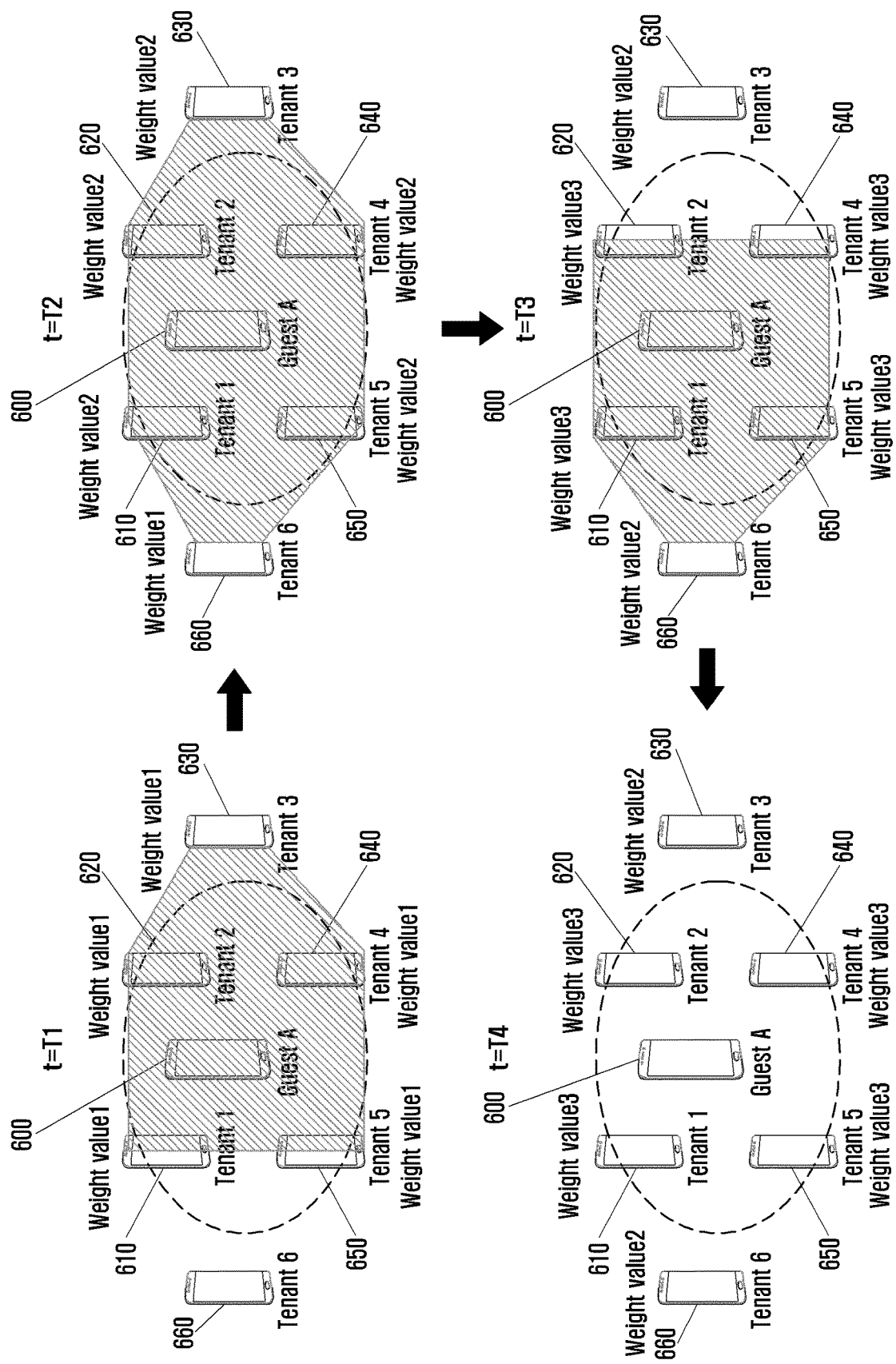
FIG. 6 is a diagram illustrating an example method in which a management server estimates the location of a mobile terminal according to still another example embodiment of the present disclosure.

FIG. 6 is a diagram illustrating an example method in which a management server estimates the location of a mobile terminal according to still another example embodiment of the present disclosure.

Referring to FIG. 6, a management server may receive first identification information of a visitor terminal 600 and second identification information of staff terminals 610, 620, 630, 640, 650 and/or 660, and may estimate the location of the visitor terminal 600 on the basis of the location information that is mapped on the second identification information. According to various example embodiments, the first identification information and the second identification information may be transmitted to the management server by the staff terminals 610 to 660, or may be transmitted from the visitor terminal 600 to the management server.

In a wireless communication system, due to the technical characteristics, a Radio Frequency (RF) signal fluctuate, and the visitor terminal 600 may not fixedly recognize the RF signal in accordance with the locations of the staff terminals 610 to 660.

For example, since the third staff terminal 630 and the sixth staff terminal 660 may be located in an RF coverage boundary area of the visitor terminal 600, the visitor terminal 600 may not fixedly recognize the third staff terminal 630 and the sixth staff terminal 660.

In order to prevent and/or reduce the chances of an error of the location estimation information of the visitor terminal 600 in accordance with the change of the RF signal, according to the present disclosure, a weight value in accordance with the signal strength measurement according to time is applied to the location information of the staff terminals 610 to 660, and thus the management server can improve the accuracy of the location estimation information of the visitor terminal 600.

At first time (t=T1), if it is determined that the measurement signal strength of the first to fifth staff terminals 610 to 650 is higher than a set strength, the visitor terminal 600 may set a weight value to the location information that corresponds to the first to fifth staff terminals 610 to 650. In contrast, if it is determined that the measurement signal strength of the sixth staff terminal 660 is lower than the set strength, the visitor terminal 600 may not set the weight value to the location information that corresponds to the sixth staff terminal 660.

At second time (t=T2), if it is determined that the measurement signal strength of the first to sixth staff terminals 610 to 660 is higher than the set strength, the visitor terminal 600 may set the weight value to the location information that corresponds to the first to sixth staff terminals 610 to 660. In this case, "weight value 2" is applied to the first to fifth staff terminals 610 to 650, and "weight value 1" is applied to the sixth staff terminal 660.

At third time (t=T3), if it is determined that the measurement signal strength of the staff terminals 610, 620, and 640 to 660 except for the third staff terminal 630 is higher than the set strength, the visitor terminal 600 may set the weight value to the location information that corresponds to the staff terminals 610, 620, and 640 to 660. On the other hand, if it is determined that the signal strength measurement of the third staff terminal 630 is lower than the set strength, the visitor terminal 600 may not set the weight value to the third staff terminal 630. In this case, "weight value 2" is applied to the location information that corresponds to the third and sixth staff terminals 630 and 660, and "weight value 3" is applied to the location information that corresponds to the first, second, fourth, and fifth staff terminals 610, 620, 640, and 650.

At fourth time (t=T4), the management server may estimate the location of the visitor terminal 600 in consideration of the weight value in accordance with the measurement signal strength that is applied to the staff terminals 610 to 660 and the location information that is mapped on the identification information of the staff terminals 610 to 660, and may generate the location estimation information of the visitor terminal 600.

Figure 7:
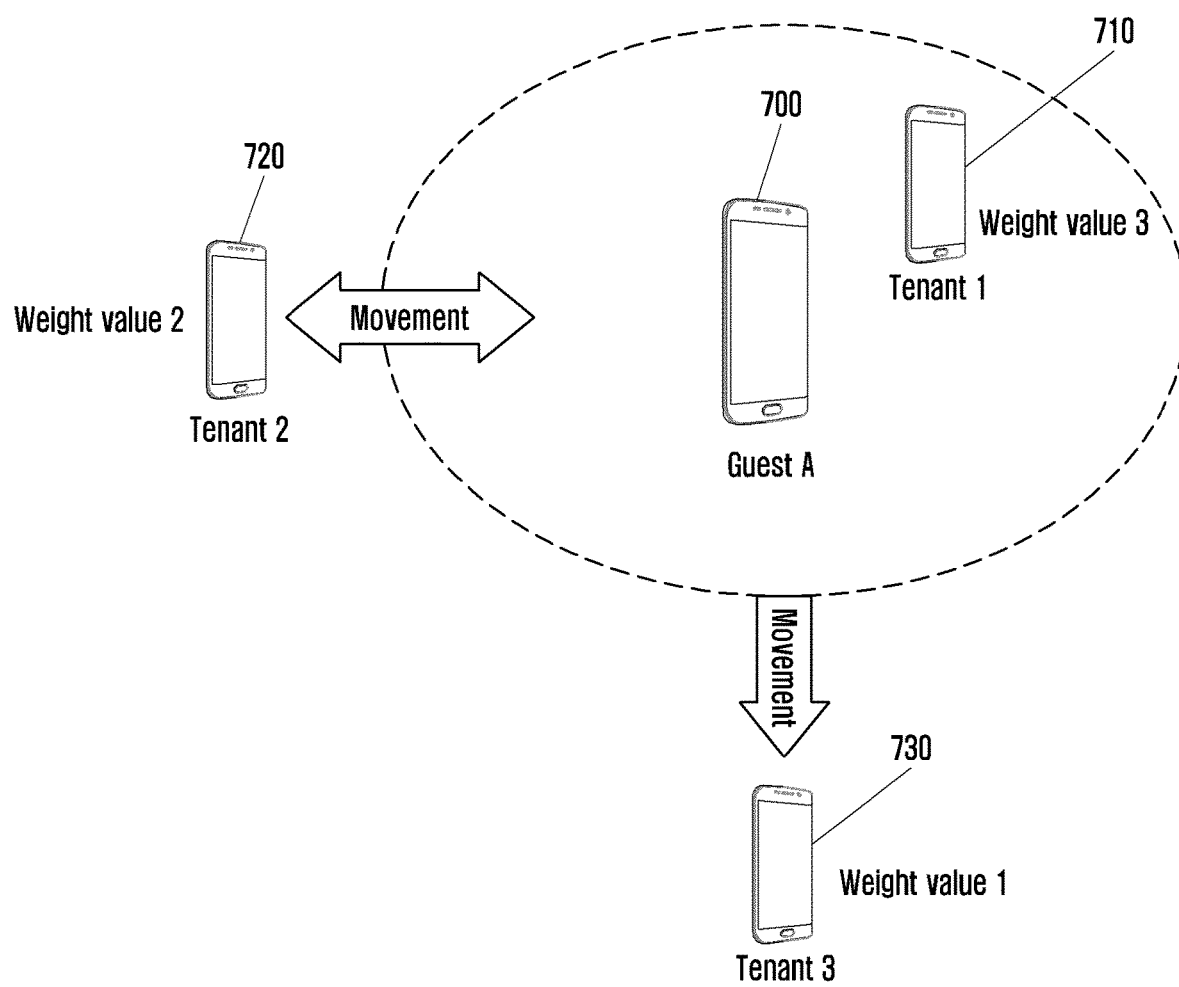
FIG. 7 is a diagram illustrating an example method in which a management server estimates the location of a mobile terminal according to still another example embodiment of the present disclosure.

FIG. 7 is a diagram illustrating an example method in which a management server estimates the location of a mobile terminal according to still another example embodiment of the present disclosure.

Referring to FIG. 7, the management server may set a weight value to location information of staff terminals 710, 720 and/or 730 in consideration of the stay time of the staff terminals 710 to 730 in the Bluetooth Low Energy (BLE) coverage of a visitor terminal 700 or the entrance frequency of the staff terminals 710 to 730 in the BLE coverage.

For example, the management server may apply "weight value 3" to first location information of the first staff terminal 710 that stays in the BLE coverage of the visitor terminal 700 for a preset critical time. The management server may apply "weight value 2" to second location information of the second staff terminal 720 that enters in the BLE coverage for the critical time, and may apply "weight value 1" to third location information of the third staff terminal 730 that does not exist in the BLE coverage for the critical time.

Figure 8:
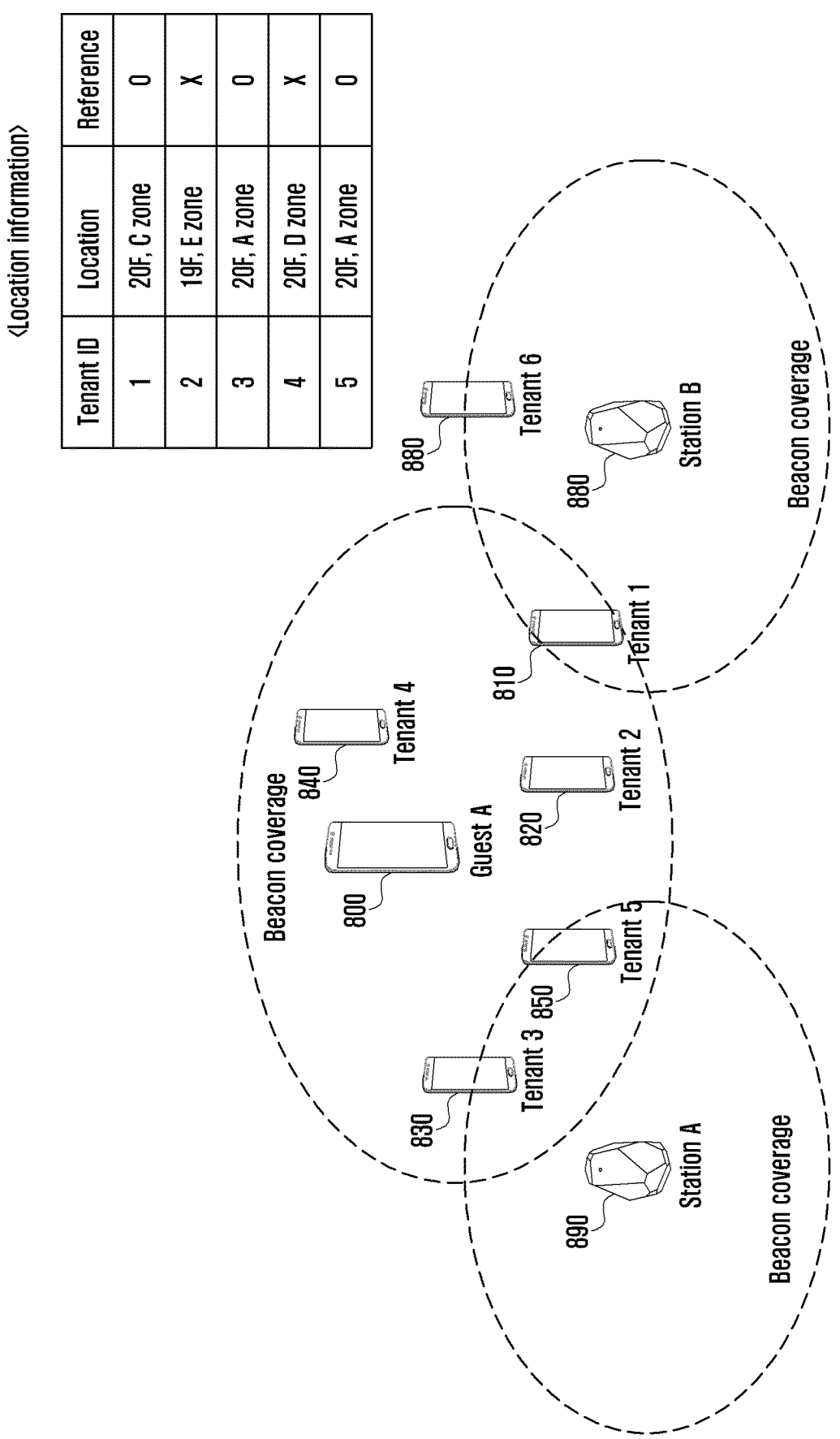
FIG. 8 is a diagram illustrating an example method in which a management server estimates the location of a mobile terminal according to still another example embodiment of the present disclosure.

FIG. 8 is a diagram illustrating an example method in which a management server estimates the location of a mobile terminal according to still another example embodiment of the present disclosure.

Referring to FIG. 8, a management server may receive first identification information of a visitor terminal 800, second identification information of staff terminals 810, 820, 830, 840, 850 and/or 860, and fixed location information of fixed beacons 870 and 880, and may estimate the location of the visitor terminal 800 based on the location information that is mapped on the second identification information and the fixed location information. According to various example embodiments, the first identification information, the second identification information, and the fixed location information may be transmitted to the management server by the staff terminals 810 to 860, or may be transmitted from the visitor terminal 800 to the management server.

For example, if the third staff terminal 830 receives the first fixed location information from the first fixed beacon 870 and receives the first identification information from the visitor terminal 800, the third staff terminal 830 may transmit the second identification information of the third staff terminal 830 to the management server together with the first fixed location information and the first identification information.

If the first fixed location information is received, the management server may determine that the location information that is mapped on the second identification information is more reliable, may give importance (or weight value) to the location information, and may relieve the corresponding location information rather than other location information.

Through simultaneous utilization of a second mobile terminal that performs a mobile beacon function and a fixed beacon that is installed in a specific space, the management server can estimate the location of the first mobile terminal more accurately using the location information that is received from the mobile terminal and the fixed location information that is received from the fixed beacon. For example, the management server is provided with accurate reference location information from a small number of fixed beacons installed in a specific space, and thus it can heighten reliability of information that is transmitted from the second mobile terminal.

In FIG. 8, since the first, third, and fifth staff terminals 810, 830, and 850 receive the fixed location information from the fixed beacons 870 and 880, the management server may generate the location estimation information of the visitor terminal 800 through allocation of the weight value to the location information that is related to the first, third, and fifth staff terminals 810, 830, and 850.

According to another example embodiment, in the case where the visitor terminal 800 transmits a beacon message to the staff terminals 810 to 860, the management server may control only the first, third, and fifth staff terminals 810, 830, and 850, which have received the fixed location information from the fixed beacons 870 and 880 among the staff terminals 810 to 860, to transmit the beacon signal to the visitor terminal 800, and thus the power consumption can be reduced.

Figure 9:
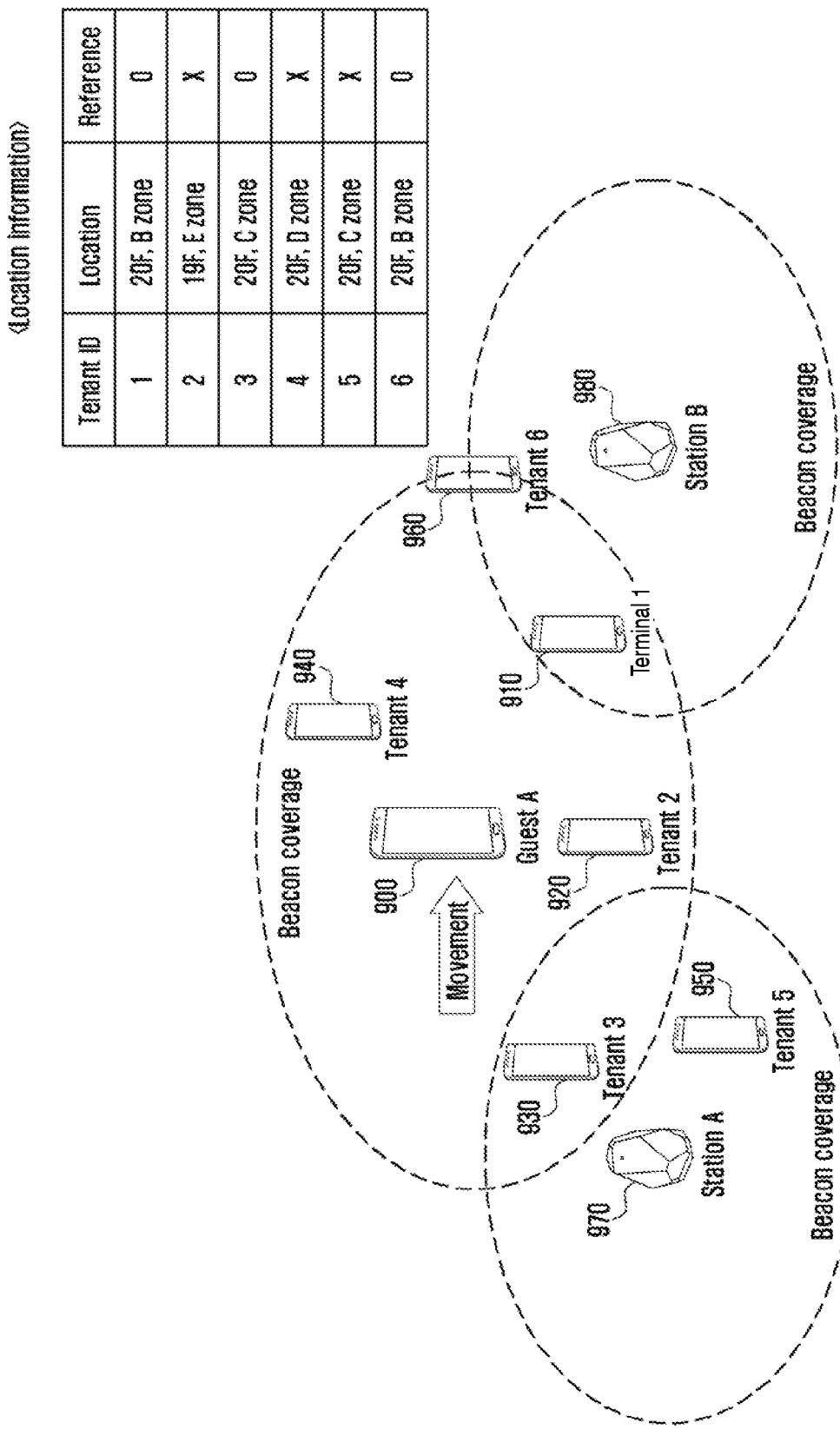
FIG. 9 is a diagram illustrating an example method in which a management server estimates the location of a mobile terminal according to still another example embodiment of the present disclosure.

FIG. 9 is a diagram illustrating an example method in which a management server estimates the location of a mobile terminal according to still another example embodiment of the present disclosure.

Referring to FIG. 9, a management server may receive first identification information of a visitor terminal 900, second identification information of staff terminals 910, 920, 930, 940, 950 and/or 960, and fixed location information of fixed beacons 970 and 980, and may estimate the location of the visitor terminal 900 based on the location information that is mapped on the second identification information and the fixed location information. According to various example embodiments, the first identification information, the second identification information, and the fixed location information may be transmitted to the management server by the staff terminals 910 to 960, or may be transmitted from the visitor terminal 900 to the management server.

Referring to FIGS. 8 and 9, it is assumed that a visitor terminal 800 or 900 that is in the location of FIG. 8 at first time moves to the location of FIG. 9.

In FIG. 8, if the first, third, and fifth staff terminals 810, 830, and 850 have received the fixed location information from the fixed beacons 870 and 880 and have provided the reference to the management server, the first, third, and sixth staff terminals 910, 930, and 950 in FIG. 9 may receive the fixed location information from the fixed beacons 970 and 980 and may provide the reference to the management server.

The management server may estimate the location of the visitor terminal 900 from the first time to the second time in consideration of the reference, and may generate the location estimation information.

Figure 10:
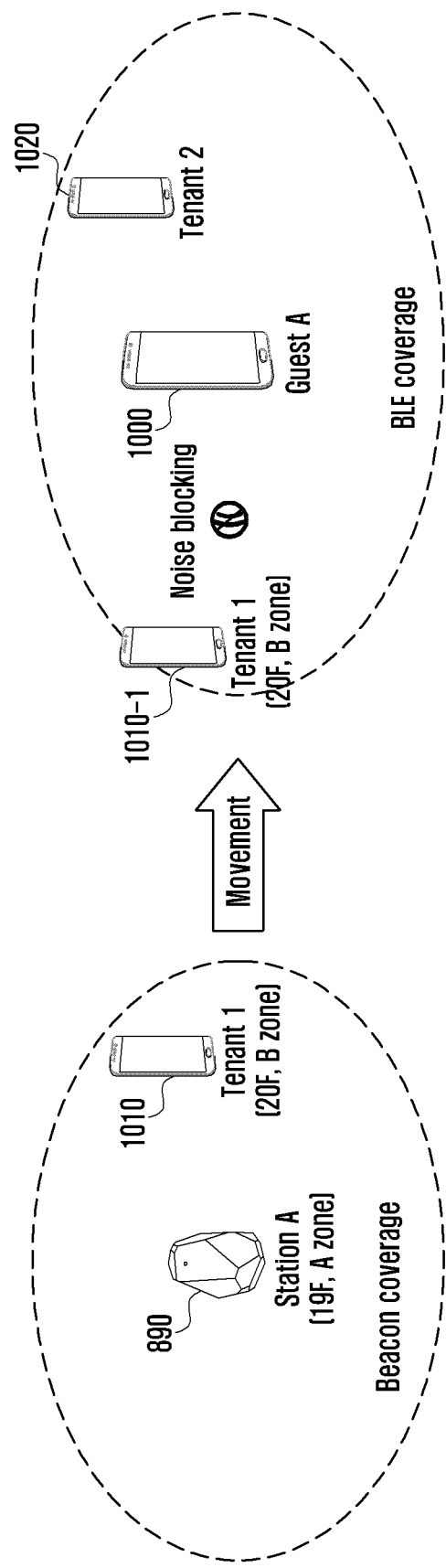
FIG. 10 is a diagram illustrating an example method in which a management server estimates the location of a mobile terminal according to still another example embodiment of the present disclosure.

FIG. 10 is a diagram illustrating an example method in which a management server estimates the location of a mobile terminal according to still another example embodiment of the present disclosure.

Referring to FIG. 10, a first staff terminal 1010 may exist in a beacon coverage of a fixed beacon 890, and fixed location information of the fixed beacon may be "19F, A zone", whereas location information of the first staff terminal 1010 may be "20F, B zone".

The management server may compare the location information that is mapped on the first staff terminal 1010 with the fixed location information of the fixed beacon 890. The management server may sense that the above-described location information is inaccurate information if the location information and the fixed location information are different from each other. The management server may transmit, to the first staff terminal 1010, a first setting message that instructs the first staff terminal 1010 not to transmit a beacon message.

Even if the first staff terminal 1010 that has received the first setting message moves into the Bluetooth Low Energy (BLE) coverage of the visitor terminal 1000, a visitor terminal 1000 does not receive the beacon message that includes a beacon terminal ID from the first staff terminal 1010-1 to block the noise, and the management server can improve the accuracy of the location estimation of the first staff terminal 1010.

Figure 11:
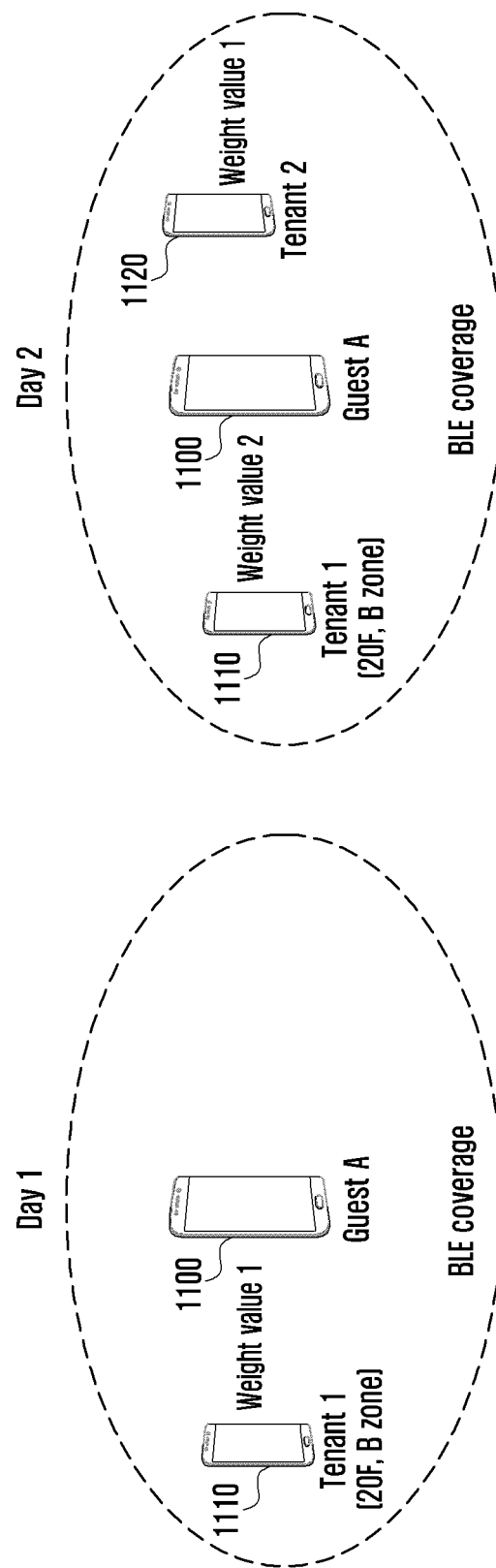
FIG. 11 is a diagram illustrating an example method in which a management server estimates the location of a mobile terminal according to still another example embodiment of the present disclosure.

FIG. 11 is a diagram illustrating an example method in which a management server estimates the location of a mobile terminal according to still another example embodiment of the present disclosure.

Referring to FIG. 11, the management server may construct visit history data of staff terminals having frequent visits in the BLE coverage of a visitor terminal 1100 using big data.

For example, in the case where the first staff terminal 1110 recorded its visit in the BLE coverage of the visitor terminal 1100 on the first day Day1, and then visited again in the BLE coverage on the second day Day2, the management server may apply "weight value 2" to the location information of the first staff terminal 1110. The management server may apply "weight value 1" to the location information of the second staff terminal 1120 which did not visit in the BLE coverage of the visitor terminal 1100 on the first day Day1, but visited in the BLE coverage on the second day Day2.

According to an example embodiment, the management server may apply a weight value to the location information of the mobile terminal that provides information that is similar to the learned location on the basis of the location that the mobile terminal frequently visits.

Figure 12A:
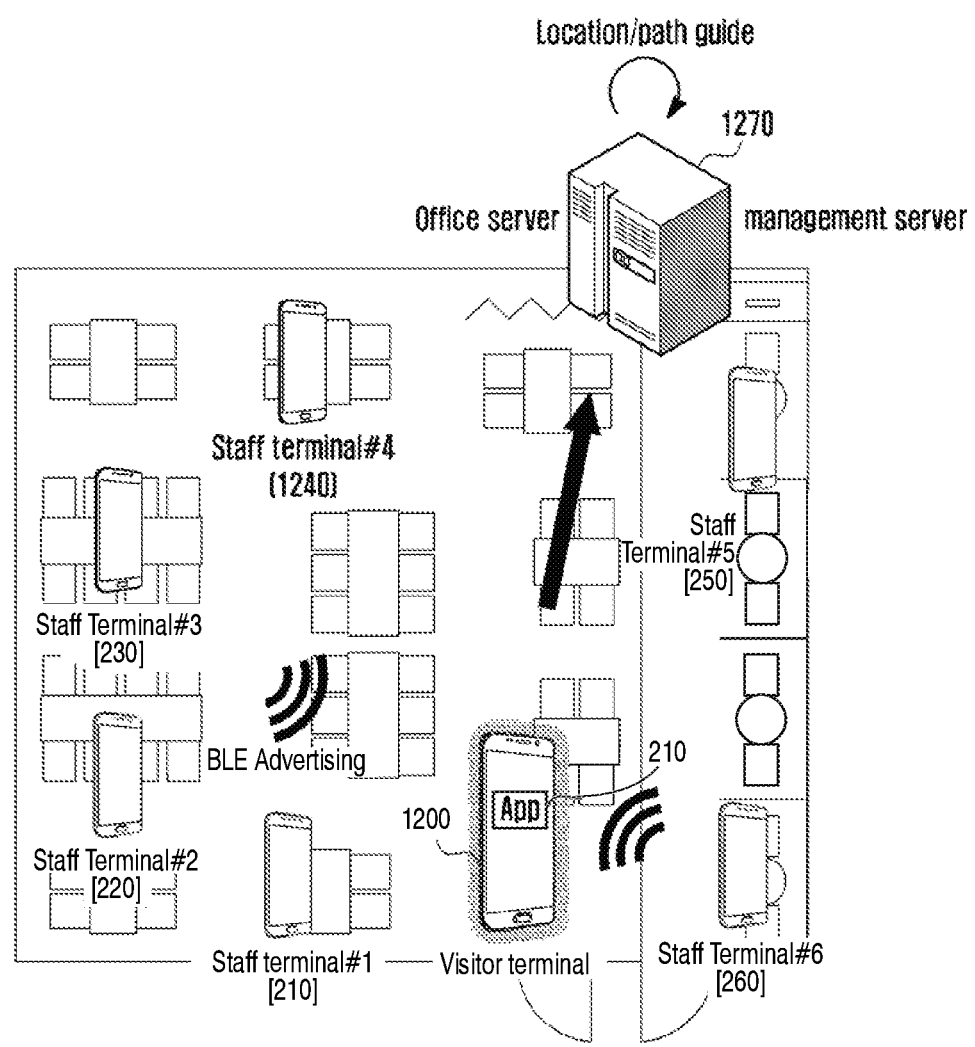
FIG. 12A is a diagram illustrating an example method for estimating the location of a mobile terminal according to another example embodiment of the present disclosure.

FIG. 12A is a diagram illustrating an example method for estimating the location of a mobile terminal according to another example embodiment of the present disclosure.

Referring to FIG. 12A, a user of a visitor terminal 1200 may execute an application program 1201 that is installed in the visitor terminal 1200 in an environment that provides a location estimation service of a mobile terminal. The application program 1201 may refer, for example, to a program that can issue a visitor ID when a visitor registers his/her visit, perform short-range wireless communication with staff terminals 1210, 1220, 1230, 1240, 1250 and 1260, and send/receive data with a management server 1270.

If the visitor terminal 1200 passes through an entrance of an office, the visitor terminal 1200 may receive a beacon message, which is broadcast from the staff terminals 1210 to 1260 and includes second identification information (e.g., staff ID) of the staff terminals 1210 to 1260, through the short-range wireless communication.

For example, the visitor terminal 1200 may receive the beacon message from the first staff terminal 1210 that is adjacent to the visitor terminal, but may not receive the beacon image from the fifth staff terminal 1250 that is relatively far from the visitor terminal 1200.

If the beacon message that is broadcast from the staff terminals 1210 to 1260 is received, the visitor terminal 1200 may transmit the first identification information of the visitor terminal 1200 to the management server 1270 together with the second identification (e.g., staff IDs) of the staff terminals 1210 to 1260 that is included in the beacon message.

The management server 1270 may estimate the location of the visitor terminal 1200 based on location information that is mapped on the second identification information that is received from the visitor terminal 1200, and may generate location estimation information for the visitor terminal 1200.

The location information may be pre-stored in a database that is included in the management server 1270 based on duty location information of users of the staff terminals 1210 to 1260, or may be generated (or updated) based on the location information that is transmitted from the staff terminals 1210 to 1260. For example, the location information may be set based on places that are assigned to office stationed staffs, or may be generated (or updated) through real-time location tracking with respect to the staff terminals 1210 to 1260.

The management server 1270 may determine the location of the staff terminals 1210 to 1260 that correspond to the second identification information using the location information that is mapped on the second identification information, and may estimate that the visitor terminal 1200 is located in the neighborhood of the staff terminals 1210 to 1260.

The management server 1270 may track the location of the visitor based on the location estimation information for the visitor terminal 1200, and may transmit the location estimation information to the visitor terminal 1200. According to an example embodiment, the management server 1270 may transmit destination path information, unauthorized area alarm information, and destination expectation time consumption information to the visitor terminal 1200 together with the location estimation information.

Figure 12B:
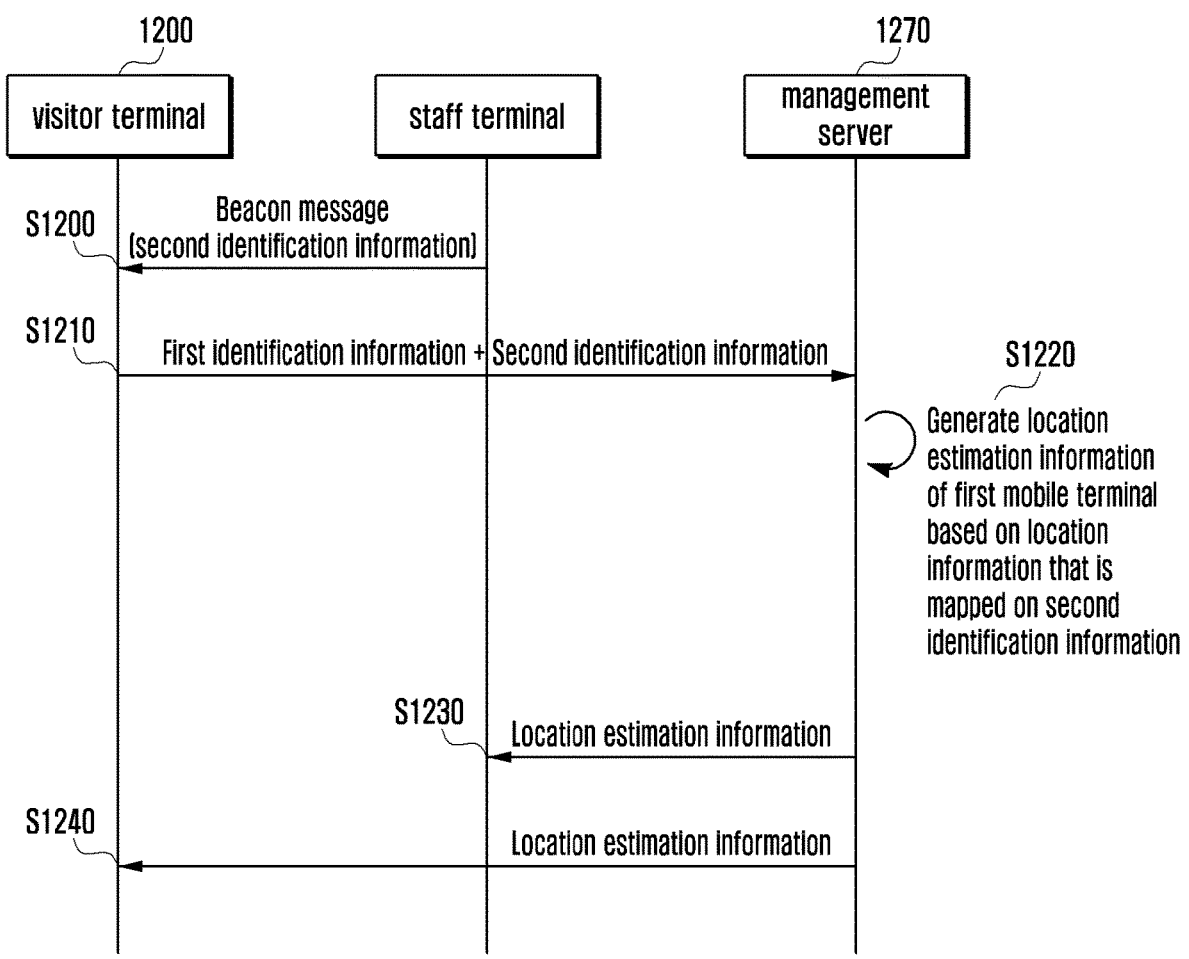
FIG. 12B is a flowchart illustrating an example method for estimating the location of a mobile terminal according to another example embodiment of the present disclosure.

FIG. 12B is a flowchart illustrating an example method for estimating the location of a mobile terminal according to another example embodiment of the present disclosure.

Referring to FIG. 12B, a visitor terminal may receive a beacon message that includes second identification information of a staff terminal from the staff terminal through short-range wireless communication (S1200). The visitor terminal may transmit the second identification information to a management server together with first identification information of the visitor terminal (S1210).

The management server may estimate the location of the visitor terminal based on location information that is mapped on the second identification information, and may generate location estimation information of the visitor terminal (S1220). The management server may transmit the location estimation information to the staff terminal (S1230), and/or may transmit the location estimation information to the visitor terminal (S1240).

The management server may update the second identification information that is transmitted from the staff terminal in a predetermined period, and may generate the location estimation information based on the updated second identification information.

The management server may receive third identification information of another staff terminal that is adjacent to the staff terminal from the visitor terminal, may estimate the location of the visitor terminal based on the location information that is related to the second identification information and the third identification information, and may update the location estimation information.

The management server may receive signal strength information of the beacon message that is measured by the visitor terminal from the visitor terminal, may compare the signal strength information with a preset value, may apply a weight value to the location information that corresponds to the staff terminal in accordance with the result of the comparison, and may update the location estimation information using the weight value.

The management server may receive fixed location information for a first beacon that is installed in a first space from the visitor terminal, may apply a weight value to the location information that corresponds to the staff terminal that has received the fixed location information, and may update the location estimation information for the visitor terminal using the location information to which the weight value has been applied and the fixed location information.

The management server may transmit an activation flag to the first beacon that is adjacent to the visitor terminal based on the location estimation information, and the fixed location information may be transmitted from the first beacon to the staff terminal in response to the activation flag.

Figure 13:
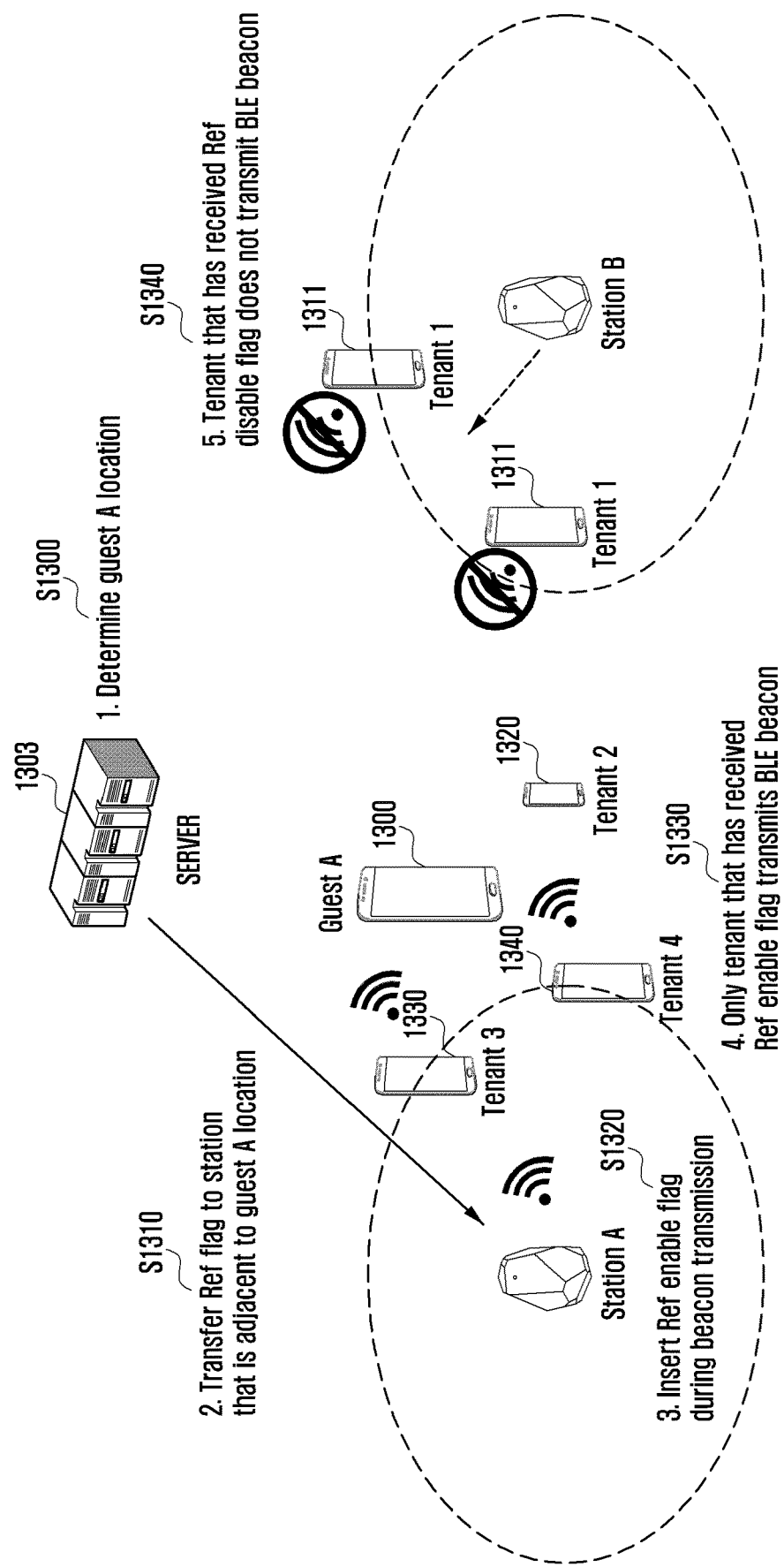
FIG. 13 is a diagram illustrating an example method in which a management server estimates the location of a mobile terminal according to still another example embodiment of the present disclosure.

FIG. 13 is a diagram illustrating an example method in which a management server estimates the location of a mobile terminal according to still another example embodiment of the present disclosure.

A management server 1303 may determine (or estimate) the location of a visitor terminal 1300 through the method as described above with reference to FIGS. 1 to 12B (S1300). The management server 1303 may transmit an activation flag (or Reference (Ref) flag) to a first fixed beacon (station A) that is adjacent to the location of the visitor terminal 1300 (S1310).

The first fixed beacon (station A) may include a Reference (Ref) enable flag that is inserted therein when the beacon signal is transmitted in response to the activation flag (S1320). The third staff terminal 1330 and the fourth staff terminal 1340 that are adjacent to the first fixed beacon (station A) may receive the Ref enable flag from the first fixed beacon (station A), and may transmit a BLE beacon signal to the visitor terminal 1300 in response to the Ref enable flag (S1330). However, since the second staff terminal 1320 does not receive the Ref enable flag from the first fixed beacon (station A), it does not transmit the BLE beacon signal to the visitor terminal 1300.

For example, since only the staff terminal that has received the Ref enable flag from the fixed beacon is set to transmit the BLE beacon signal to the visitor terminal, power consumption of the terminals can be reduced, and frequency-time resources can be saved.

The management server 1303 may transmit an inactivation flag to a second fixed beacon (station B) that is not adjacent to the location of the visitor terminal 1300. The second fixed beacon (station B) may include a Reference (Ref) disable flag that is inserted therein when the beacon signal is transmitted in response to the inactivation flag. The staff terminals 1310 and 1311 that are adjacent to the second fixed beacon (station B) may receive the Ref disable flag from the second fixed beacon (station B), and may not transmit the BLE beacon signal to the visitor terminal 1300 in response to the Ref disable flag (S1340).

Figure 14:
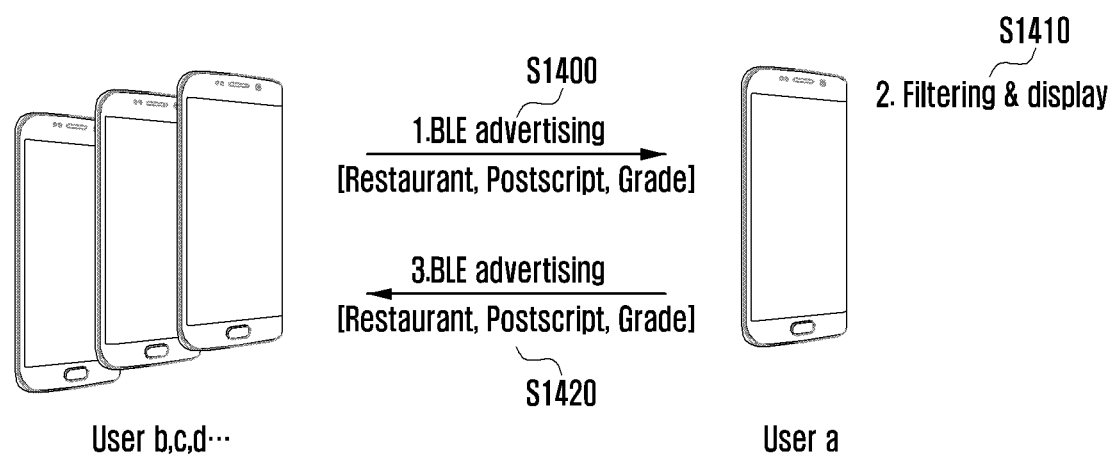
FIG. 14 is a diagram illustrating an example social recommendation service through information exchange between mobile terminals according to an example embodiment of the present disclosure.

FIG. 14 is a diagram illustrating an example social recommendation service through information exchange between mobile terminals according to an example embodiment of the present disclosure.

According to the present disclosure, a service (e.g., location information providing, advertisement information providing, or social media) may be provided through mutual information exchange between moving mobile terminals, and as more users perform the mutual information exchange, more accurate and diverse information services can be provided. Further, according to the present disclosure, the existing beacon service coverage can be extended through the mutual information exchange between the mobile terminals, and interactive communication can be provided between anonymous users.

According to the present disclosure, each person may become the subject of a beacon service using a mobile terminal, may acquire necessary information through information exchange between mobile terminals in a specific area, and may combine the information as described above with commercial information to increase gains of consumers and enterprises.

Referring to FIG. 14, a specific mobile terminal (User a) that performs a mobile beacon function may execute an application program that is installed in the terminal, and may receive BLE advertising signals from a plurality of terminals that perform the mobile beacon function (S1400). The BLE advertising signal may include neighboring restaurant information, postscript for neighboring restaurants, and grade information of neighboring restaurants when the specific mobile terminal searches, for example, information on restaurants in the application program.

The specific mobile terminal (User a) may perform filtering of information that is included in the BLE advertising signal, and may display necessary information on a display (S1410). The specific mobile (User a) may transmit the BLE advertising signal to at least one of the plurality of mobile terminals (b, c, d, . . . ) (S1420). For example, after using a neighboring restaurant, the specific mobile terminal (User a) may transmit a postscript for the neighboring restaurant to at least one of the plurality of mobile terminals through the BLE advertising signal.

Figure 15:
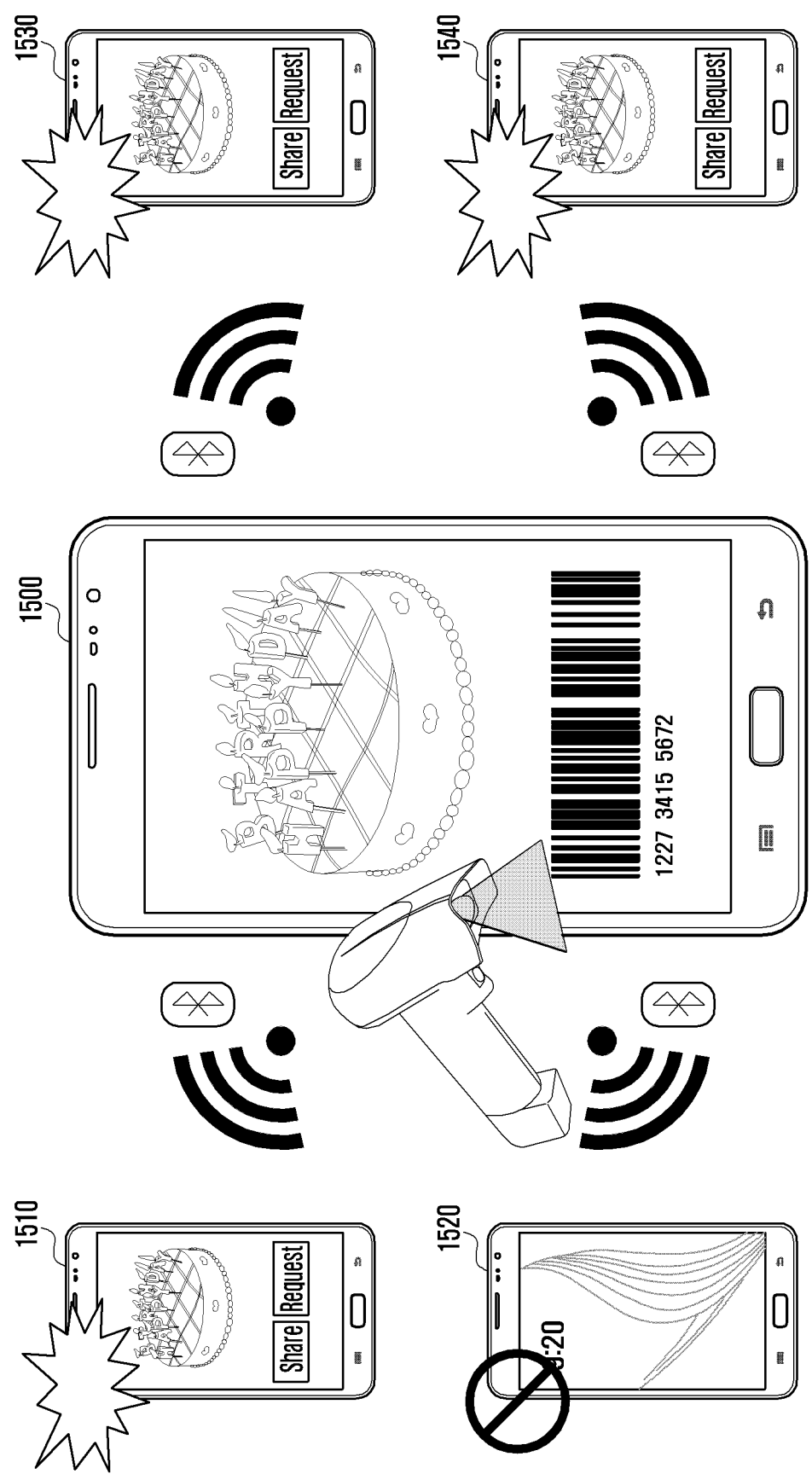
FIG. 15 is a diagram illustrating an example coupon sharing service through information exchange between mobile terminals according to an example embodiment of the present disclosure.

FIG. 15 is a diagram illustrating an example coupon sharing service through information exchange between mobile terminals according to an example embodiment of the present disclosure.

Referring to FIG. 15, if a specific mobile terminal 1500 uses or receives a coupon (e.g., birthday cake coupon), coupon information for the coupon may be broadcasted from the mobile terminal 1500.

Adjacent terminals 1510, 1530 and/or 1540 may receive the coupon information, may share the coupon information through a display, or may request the coupon from the specific mobile terminal 1500. However, a second mobile terminal 1520 that has preset not to be provided with a coupon sharing service does not receive the coupon information.

For example, if a third mobile terminal 1530 selects a coupon request, a user ID of the third mobile terminal 1530 and a corresponding coupon request message may be broadcast. If sharing/division of the corresponding coupon is possible in an application program of the specific mobile terminal 1500, the specific mobile terminal 1500 may broadcast the user ID of the specific mobile terminal 1500 and the corresponding coupon.

Figure 16:
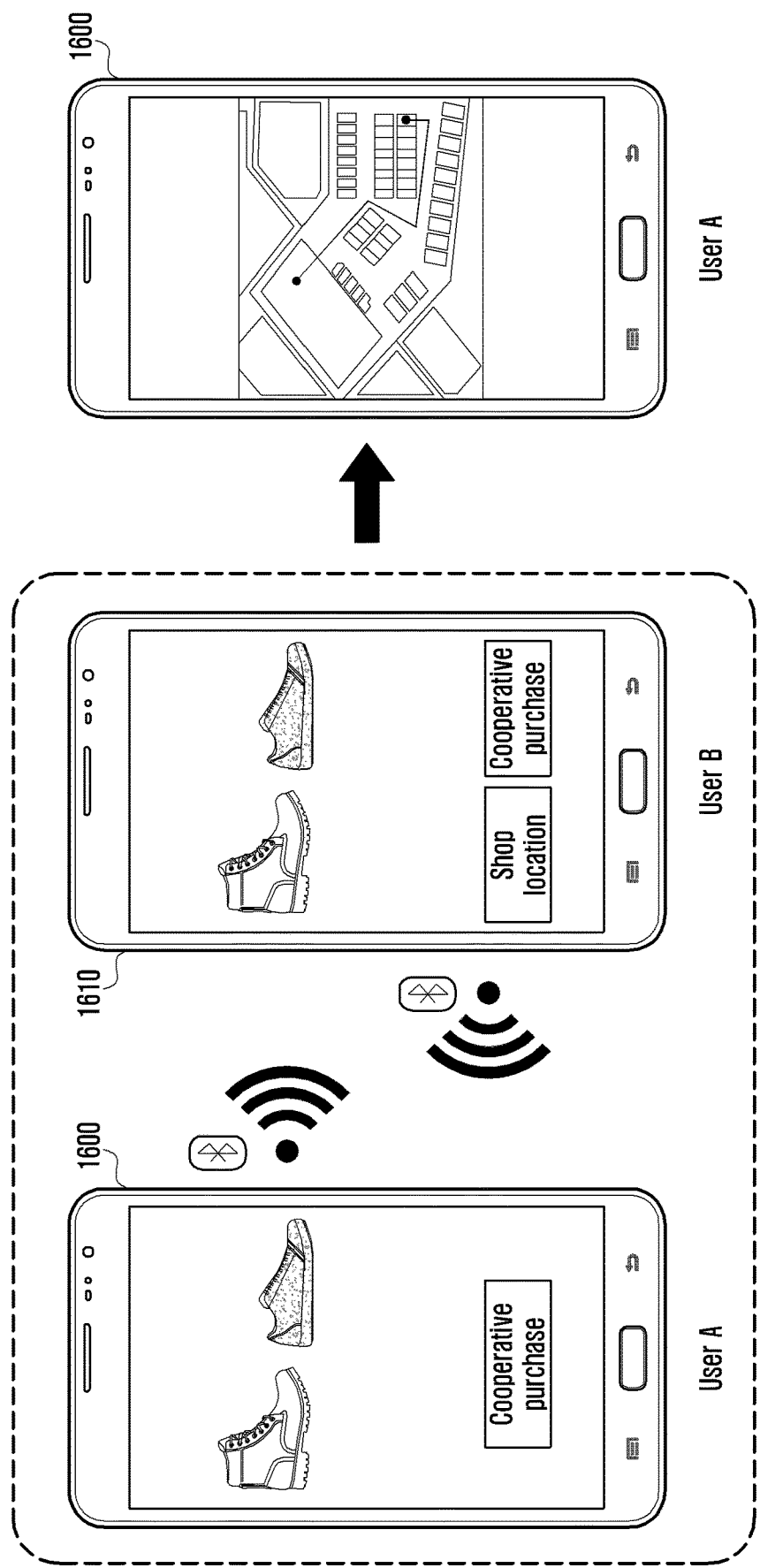
FIG. 16 is a diagram illustrating an example instant cooperative purchase through information exchange between mobile terminals according to an example embodiment of the present disclosure.

FIG. 16 is a diagram illustrating an example instant cooperative purchase through information exchange between mobile terminals according to an example embodiment of the present disclosure.

In the case where an event in which discount is allowed for purchase of plural pairs of shoes proceeds in a department store, the first mobile terminal 1600 of user A who intends to purchase a pair of shoes may perform an instant cooperative purchase through information exchange between mobile terminals.

If the first mobile terminal 1600 of user A performs the cooperative purchase through an application program, the user ID of the first mobile terminal 1600 and the corresponding event information may be broadcast. The second mobile terminal 1610 of user B receives the corresponding event information that is broadcast from the first mobile terminal 1600, and may determine whether to perform the cooperative purchase. If the second mobile terminal 1610 selects the cooperative purchase, the user ID of the second mobile terminal 1610 and cooperative purchase consent information may be broadcasted.

The first mobile terminal 1600 may recognize a person who intends to perform the cooperative purchase through reception of the cooperative purchase consent information, and may confirm the location information of the second mobile terminal 1610 through the user ID of the second mobile terminal 1610.

Figure 17:
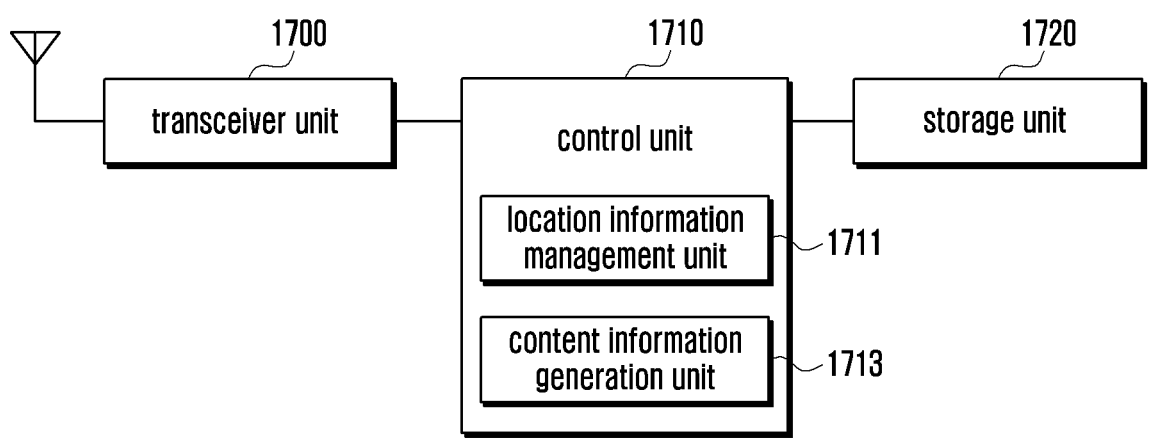
FIG. 17 is a block diagram illustrating an example configuration of a management server according to an example embodiment of the present disclosure.

FIG. 17 is a block diagram illustrating an example configuration of a management server according to an example embodiment of the present disclosure.

Referring to FIG. 17, a management server may include a transceiver unit (e.g., including transceiver circuitry) 1700, a control unit (e.g., including controller circuitry, processing circuitry, or the like) 1710, and a storage unit 1720.

The transceiver unit 1700 may include various communication circuitry, such as, for example, and without limitation, a transceiver, that performs transmission/reception of corresponding data for wireless communication of the management server. The transceiver unit 1700 may include, for example, and without limitation an RF transmitter configured to perform up-conversion and amplify the frequency of a transmitted signal, and an RF receiver configured to perform low-noise-amplification of a received signal and to perform down-conversion of the frequency of the received signal.

Further, the transceiver unit 1700 may receive data through a wireless channel to output the received data to the control unit 1710, and may transmit the data that is output from the control unit 1710 through the wireless channel.

The control unit 1710 may include various controller and/or processing circuitry that controls a signal flow between respective blocks so that the management server can operate according to embodiments of the present disclosure. For example, the control unit 1710 operates to receive, from the mobile terminal, a mobile terminal ID of the mobile terminal and a beacon terminal ID of the beacon terminal that is broadcasted by the beacon terminal, to generate content information on the basis of the first location information that is related to the mobile terminal ID and the second location information that is related to the beacon terminal ID, and to transmit the content information to the mobile terminal.

According to an example embodiment, the mobile terminal may be the visitor terminal as described above with reference to FIGS. 2A to 13, and the beacon terminal may be the staff terminal as described above with reference to FIGS. 2A to 13.

According to another example embodiment, the mobile terminal may be the staff terminal as described above with reference to FIGS. 2A to 13, and the beacon terminal may be the visitor terminal as described above with reference to FIGS. 2A to 13.

In order to perform the above-described function, the control unit 1710 may further include a location information management unit 1711 and a content information generation unit 1713.

The location information management unit 1711 may include various circuitry and/or program elements that manage (process) the first location information that is related to the mobile terminal ID and the second location information that is related to the beacon terminal ID. The first location information may include path history information for the mobile terminal ID, and the second location information may include path history information for the beacon terminal ID.

The location information management unit 1711 may update at least one of the first location information and the second location information in a preset period.

The content information generation unit 1713 may include various circuitry and/or program elements that generate the content information that is provided to the mobile terminal on the basis of the first location information that is related to the mobile terminal ID and the second location information that is related to the beacon terminal ID. The content information may refer, for example, to information that is related to a specific service (e.g., location information providing, advertisement information providing, or social media) through mutual location information exchange between the mobile terminal and the beacon terminal.

The storage unit 1720 may store therein programs and data that are required to operate the management server, and may be divided into a program region and a data region. The storage unit 1720 may store therein the first location information that is related to the mobile terminal ID and the second location information that is related to the beacon terminal ID.

Figure 18:
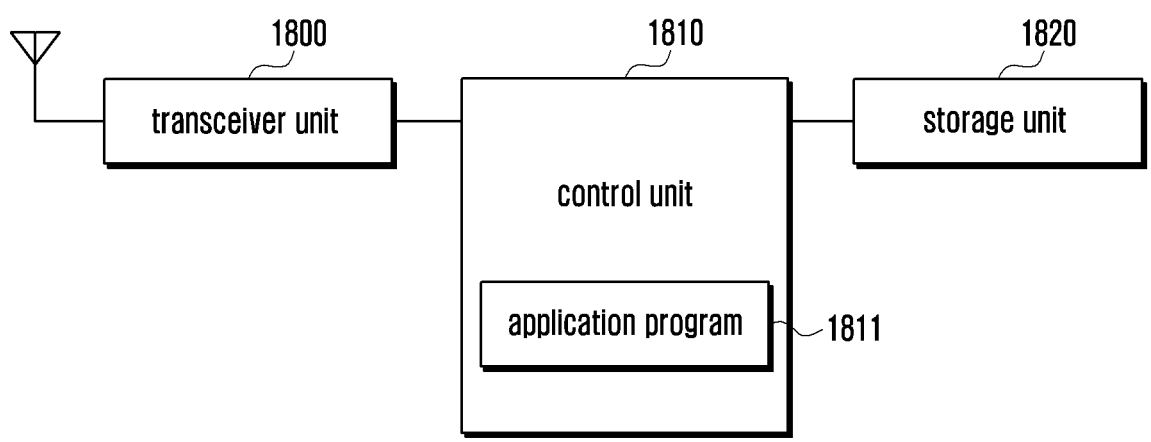
FIG. 18 is a block diagram illustrating an example configuration of a mobile terminal according to an example embodiment of the present disclosure.

FIG. 18 is a block diagram illustrating an example configuration of a mobile terminal according to an example embodiment of the present disclosure.

Referring to FIG. 18, the mobile terminal may include a transceiver unit (e.g., including transceiver circuitry) 1800, a control unit (e.g., including controller and/or processing circuitry) 1810, and a storage unit 1820.

The transceiver unit 1800 may include various communication circuitry, such as, for example, and without limitation, transceiver circuitry that performs transmission/reception of corresponding data for wireless communication of the mobile terminal. The transceiver unit 1800 may transmit/receive signals with a management server or other terminals. The transceiver unit 1800 may comprise an RF transmitter configured to perform up-conversion and amplify the frequency of a transmitted signal, and an RF receiver configured to perform low-noise-amplification of a received signal and to perform down-conversion of the frequency of the received signal.

Further, the transceiver unit 1800 may receive data through a wireless channel to output the received data to the control unit 1810, and may transmit the data that is output from the control unit 1810 through the wireless channel.

The control unit 1810 may include various controller and/or processing circuitry that controls a signal flow between respective blocks so that the mobile terminal can operate according to example embodiments of the present disclosure. For example, the control unit 1810 operates to receive a beacon message that is broadcast by a beacon terminal, to transmit a mobile terminal ID of the mobile terminal and a beacon terminal ID that is included in the beacon message to the management server, and to receive, from the management server, content information that is generated based on the first location information that is related to the mobile terminal ID and the second location information that is related to the beacon terminal ID.

According to an example embodiment, the mobile terminal may be the visitor terminal as described above with reference to FIGS. 2A to 13, and the beacon terminal may be the staff terminal as described above with reference to FIGS. 2A to 13.

According to another example embodiment, the mobile terminal may be the staff terminal as described above with reference to FIGS. 2A to 13, and the beacon terminal may be the visitor terminal as described above with reference to FIGS. 2A to 13.

The control unit 1810 may include an application program 1811 in order to perform the above-described function. The application program 1811 may include various circuitry and/or program elements that control the mobile terminal so that the mobile terminal can operate according to the embodiments of the present disclosure.

The storage unit 1820 may store therein programs and data that are required to operate the mobile terminal, and may be divided into a program region and a data region.

Figure 19:
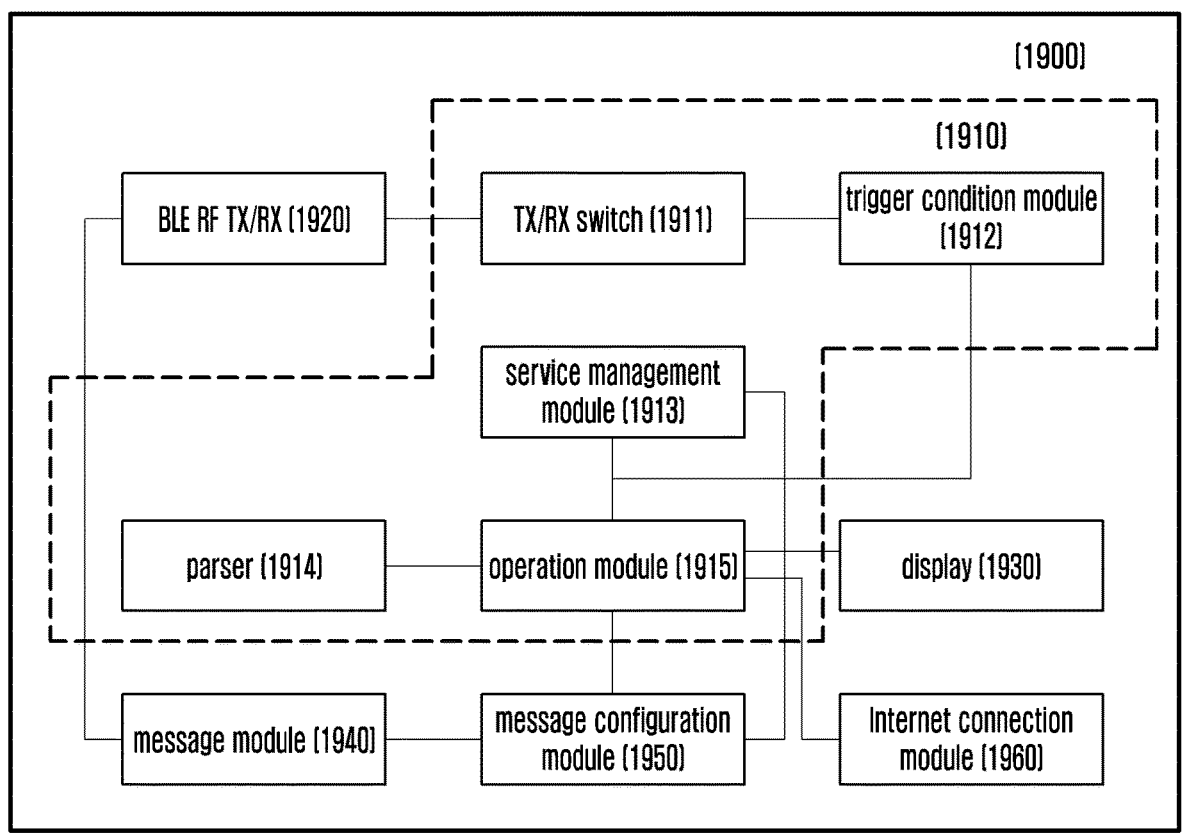
FIG. 19 is a diagram illustrating an example configuration of a control unit included in a mobile terminal according to an example embodiment of the present disclosure.

FIG. 19 is a block diagram illustrating an example configuration of a control unit that is included in a mobile terminal according to an example embodiment of the present disclosure.

Referring to FIG. 19, a control unit 1900 includes a processor (e.g., including processing circuitry) 1910, a BLE RF TX/RX (e.g., including BLE transmitting and receiving circuitry) 1920, a display 1930, a message module 1940, a message configuration module 1950, and an Internet connection module 1960.

The processor 1910 may include various processing circuitry that controls a signal flow between respective blocks so that the mobile terminal can operate according to embodiments of the present disclosure. The processor 1910 may include a TX/RX switch 1911, a trigger condition module (e.g., including trigger condition circuitry and/or program elements) 1912, a service management module (e.g., including service management circuitry and/or program elements) 1913, a parser 1914, and an operation module 1915.

The TX/RX switch 1911 is a module including circuitry for switching a transmission mode or a reception mode of the BLE RF TX/RX 1920, and the trigger condition module 1912 is a module for operating the TX/RX switch 1911. The trigger condition module 1912 may include various circuitry and/or program elements that detect a set condition and may transmit a corresponding command to the TX/RX switch 1911.

The service management module 1913 is a module including various circuitry and/or program elements that manages information that is related to services using a mobile terminal that operates as a beacon. For example, if a user registers concerned items in a shopping mall that a user has visited, the corresponding information may be stored in the service management module 1913.

The parser 1914 is a module including various circuitry and/or program elements for analyzing the contents included in the BLE beacon message, and the operation module 1915 is a module that takes charge of computing/processing.

The BLE RF TX/RX 1920 may include various BLE communication circuitry, such as, for example, and without limitation, a BLE modem, and is a module that transmits and receives an RF signal. The display 1930 is a module that shows the beacon state and related information.

The message module 1940 is a module that may include various circuitry and program elements that configures information that is transmitted from the message configuration module 1950 in a beacon format, and the message configuration module 1950 is a module that configures a transmitted message. The Internet connection module 1960 is a module that may include various circuitry and/or program elements for connecting the Internet to extract detailed information from information (e.g., beacon ID) that is received from the beacon.

Although various example embodiments of the present disclosure have been described herein with reference to the accompanying drawings and specific wordings have been used, these are merely used as general meanings to assist those of ordinary skill in the art to gain a comprehensive understanding of the present disclosure, and do not limit the scope of the present disclosure. It will be apparent to those of ordinary skill in the art to which the present disclosure pertains that various modifications, variations and alternatives are possible based on the technical concept of the present disclosure in addition to the various example embodiments disclosed herein.

What is claimed is:

1. A method by a management server for processing location information of a terminal, the method comprising:
   receiving, from a visited mobile terminal, a visited mobile terminal ID of the visited mobile terminal and a registered moving beacon terminal ID broadcast by a registered moving beacon terminal;
   generating first location information related to the visited mobile terminal ID using first path history information for the visited mobile terminal ID and second path history information for the registered moving beacon terminal ID, wherein the first path history information includes visit expectation location information for the visited mobile terminal ID, and visit history information for the visited mobile terminal ID, and the second path history information includes previous location information for the registered moving beacon terminal ID, and current location information for the registered moving beacon terminal ID;
   generating content information based on the first location information;

transmitting the content information to the visited mobile terminal;
determining a stay time value indicating a time in which the registered moving beacon terminal stays in a radio frequency (RF) coverage of the visited mobile terminal;
applying a weight value to the second path history information for the registered moving beacon terminal in a case that the stay time value is greater than a threshold value,
receiving, from the visited mobile terminal or the registered moving beacon terminal, a plurality of registered moving beacon terminal IDs broadcast by a plurality of registered moving beacon terminals adjacent to the registered moving beacon terminal; and
updating the first location information based on the weight value and second location information that is mapped on the plurality of registered moving beacon terminal IDs, wherein the updated first location information includes location estimation information that corresponds to, of the visited mobile terminal located, a specific floor and a specific zone.

2. The method of claim 1, wherein the content information comprises information related to the estimated location of the visited mobile terminal and includes at least one of: a text, a voice, an image, and a video.

3. The method of claim 1, further comprising:
updating at least one of: the first path history information and the second path history information for a predetermined time;
generating location change information of the visited mobile terminal using at least one of: the updated first path history information and second path history information; and
generating the content information related to the location change in accordance with the time of the visited mobile terminal based on the location change information.

4. The method of claim 1, further comprising:
receiving, from the visited mobile terminal, a signal strength measurement of a beacon message transmitted from the registered moving beacon terminal and includes the registered moving beacon terminal ID;
applying a weight value to the registered moving beacon terminal ID related to the registered moving beacon terminal if the signal strength measurement is greater than a preset strength; and
updating the first location information using the weight value.

5. The method of claim 1, further comprising:
receiving, from the visited mobile terminal or the registered moving beacon terminal, first fixed location information for a first fixed beacon adjacent to the registered moving beacon terminal and installed in a first space,
wherein the first location information is generated based on at least one of: the first path history information, the second path history information, and the first fixed location information.

6. The method of claim 1, further comprising:
comparing second fixed location information of a second fixed beacon adjacent to the registered moving beacon terminal and installed in a second space with third location information if the third location information indicating a location of the registered moving beacon terminal is pre-stored in the management server;
generating a first setting message instructing the registered moving beacon terminal to not transmit the registered moving beacon terminal ID to the visited mobile terminal if the second fixed location information does not coincide with the third location information based on the result of the comparison; and
transmitting the first setting message to the registered moving beacon terminal.

7. The method of claim 1, further comprising transmitting an activation flag signal to a third fixed beacon adjacent to the visited mobile terminal based on the first location information,
wherein third fixed location information of the third fixed beacon is broadcast from the third fixed beacon in response to the activation flag signal.

8. A method by a visited mobile terminal, the method comprising:
receiving a beacon message broadcast by a registered moving beacon terminal;
transmitting, to a management server, a visited mobile terminal ID of the visited mobile terminal and a registered moving beacon terminal ID of the registered moving beacon terminal included in the beacon message; and
receiving, from the management server, content information generated based on first location information related to the visited mobile terminal ID and the registered moving beacon terminal ID, wherein the first location information is generated using first path history information for the visited mobile terminal ID and second path history information for the registered moving beacon terminal ID, the first path history information includes visit expectation location information for the visited mobile terminal ID, and visit history information for the visited mobile terminal ID, and the second path history information includes previous location information for the registered moving beacon terminal ID, and current location information for the registered moving beacon terminal ID,
wherein a weight value is applied to the second path history information for the registered moving beacon terminal in a case that a stay time value is greater than a threshold value,
the stay time value indicates a time in which the registered moving beacon terminal stays in a radio frequency (RF) coverage of the visited mobile terminal,
wherein the first location information is updated based on the weight value and second location information that is mapped on a plurality of registered moving beacon terminal IDs, wherein the plurality of registered moving beacon terminal IDs are broadcast by a plurality of registered moving beacon terminals adjacent to the registered moving beacon terminal, and
wherein the updated first location information includes location estimation information that corresponds to, of the visited mobile terminal located, a specific floor and a specific zone.

9. The method of claim 8, wherein the content information comprises information related to the estimated location of the visited mobile terminal and includes at least one of: a text, a voice, an image, and a video.

10. The method of claim 8, further comprising:
transmitting a signal strength measurement of the beacon message to the management server,
wherein if the measurement signal strength is greater than a preset strength, a weight value is applied to the registered moving beacon terminal ID related to the registered moving beacon terminal, and the first location information is updated using the weight value.

11. The method of claim 8, further comprising:
transmitting, to the management server the stay time value.

12. The method of claim 8, further comprising:
receiving, from the registered moving beacon terminal, fixed location information of a fixed beacon adjacent to the registered moving beacon terminal and installed in a first space; and
transmitting the fixed location information to the management server,
wherein the content information is generated based on at least one of: first path history information, second path history information and the fixed location information.

13. A management server configured to process location information of a terminal, the management server comprising:
a transceiver unit comprising a circuitry configured to transmit and receive signals; and
a control unit including a controller comprising processing circuitry configured to receive, from a visited mobile terminal, a visited mobile terminal ID of the visited mobile terminal and a registered moving beacon terminal ID broadcast by a registered moving beacon terminal, to generate first location information related to the visited mobile terminal ID using first path history information for the visited mobile terminal ID and second path history information for the registered moving beacon terminal ID, wherein the first path history information includes visit expectation location information for the visited mobile terminal ID, and visit history information for the visited mobile terminal ID, and the second path history information includes previous location information for the registered moving beacon terminal ID, and current location information for the registered moving beacon terminal ID, to generate content information based on the first location information, to transmit the content information to the visited mobile terminal to determine a stay time value indicating a time in which the registered moving beacon terminal stays in a radio frequency (RF) coverage of the visited mobile terminal, to applying a weight value to the second path history information for the registered moving beacon terminal in a case that the stay time value is greater than a threshold value,
to receive, from the visited mobile terminal or the registered moving beacon terminal, a plurality of registered moving beacon terminal IDs broadcast by a plurality of registered moving beacon terminals adjacent to the registered moving beacon terminal, to update the first location information based on the weight value and second location information that is mapped on the plurality of registered moving beacon terminal IDs,
wherein the updated first location information includes location estimation information that corresponds to, of the visited mobile terminal located, a specific floor and a specific zone.

14. A visited mobile terminal comprising:
a transceiver unit comprising a circuitry configured to transmit and receive signals; and
a control unit including a controller comprising processing circuitry configured to receive a beacon message broadcast by a registered moving beacon terminal, to transmit, to a management server, a visited mobile terminal ID of the visited mobile terminal and a registered moving beacon terminal ID of the registered moving beacon terminal included in the beacon message, and to receive, from the management server, content information generated based on first location information related to the visited mobile terminal ID and the registered moving beacon terminal ID, wherein the first location information is generated using first path history information for the visited mobile terminal ID and second path history information for the registered moving beacon terminal ID, the first path history information includes visit expectation location information for the visited mobile terminal ID, and visit history information for the visited mobile terminal ID, and the second path history information includes previous location information for the registered moving beacon terminal ID, and current location information for the registered moving beacon terminal ID,
wherein a weight value is updated to the second path history information for the registered moving beacon terminal in a case that a stay time value is greater than a threshold value,
the stay time value indicates a time in which the registered moving beacon terminal stays in a radio frequency (RF) coverage of the visited mobile terminal,
wherein the first location information is updated based on the weight value and second location information that is mapped on a plurality of registered moving beacon terminal IDs, wherein the plurality of registered moving beacon terminal IDs are broadcast by a plurality of registered moving beacon terminals adjacent to the registered moving beacon terminal, and
wherein the updated first location information includes location estimation information that corresponds to, of the visited mobile terminal located, a specific floor and a specific zone.

* * * * *